United States Patent
Caratelli et al.

(10) Patent No.: US 12,334,643 B2
(45) Date of Patent: Jun. 17, 2025

(54) MIMO ANTENNA SYSTEM, WIRELESS DEVICE, AND WIRELESS COMMUNICATION SYSTEM

(71) Applicant: The Antenna Company International N.V., Willemstad (CW)

(72) Inventors: Diego Caratelli, Willemstad (CW); Carlos Moreno De Jong Van Coevorden, Willemstad (CW); Bedilu Befekadu Adela, Willemstad (CW); János Sófalvi, Willemstad (CW); Johan Leo Alfons Gielis, Willemstad (CW)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 77 days.

(21) Appl. No.: 17/320,898

(22) Filed: May 14, 2021

(65) Prior Publication Data

US 2022/0344836 A1 Oct. 27, 2022

(30) Foreign Application Priority Data

Apr. 21, 2021 (NL) ...................................... 2028032

(51) Int. Cl.
*H01Q 21/28* (2006.01)
*H01Q 1/22* (2006.01)
*H01Q 21/06* (2006.01)
*H04B 7/0413* (2017.01)

(52) U.S. Cl.
CPC ........... *H01Q 21/28* (2013.01); *H01Q 1/2291* (2013.01); *H01Q 21/062* (2013.01); *H04B 7/0413* (2013.01)

(58) Field of Classification Search
CPC .... H01Q 21/28; H01Q 1/2291; H01Q 21/062; H01Q 9/0414; H01Q 9/26; H01Q 9/42; H01Q 11/04; H01Q 11/14; H04B 7/0413
See application file for complete search history.

(56) References Cited

U.S. PATENT DOCUMENTS

| | | | | |
|---|---|---|---|---|
| 10,003,127 B2* | 6/2018 | Liu | ......................... | H01Q 9/42 |
| 10,797,408 B1* | 10/2020 | Boutayeb | ................. | H04B 7/10 |
| 11,271,327 B2* | 3/2022 | Shan | ...................... | H01Q 1/521 |
| 11,289,806 B1* | 3/2022 | Wyse | ....................... | H01Q 3/26 |
| 2014/0139393 A1* | 5/2014 | Yoon | ....................... | H01Q 9/42 |
| | | | | 343/845 |
| 2014/0313093 A1* | 10/2014 | Smith | ..................... | H01Q 9/26 |
| | | | | 343/795 |
| 2014/0320363 A1* | 10/2014 | Ng | ........................ | H01Q 1/526 |
| | | | | 343/770 |

(Continued)

*Primary Examiner* — Dameon E Levi
*Assistant Examiner* — Anh H Ho
(74) *Attorney, Agent, or Firm* — Nath, Goldberg & Meyer; Joshua B. Goldberg

(57) ABSTRACT

The invention relates to a MIMO antenna system for IEEE 802.11 WiFi communications. The invention also relates to a wireless device, such as a wireless access point (AP), a router, a gateway, and/or a bridge, comprising at least one antenna system according to the invention. The invention further relates to a wireless communication system, comprising a plurality of antenna systems according to the invention, and, preferably, a plurality of wireless devices according to the invention.

15 Claims, 23 Drawing Sheets

(56) References Cited

U.S. PATENT DOCUMENTS

Figure 1A:
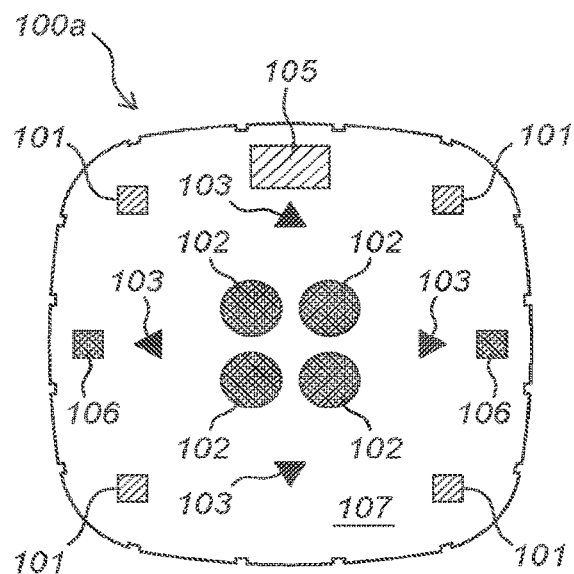
Figure 1B:
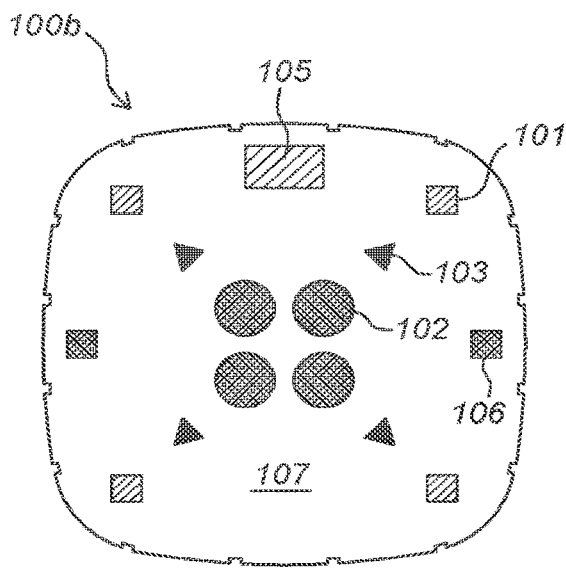
Figure 1C:
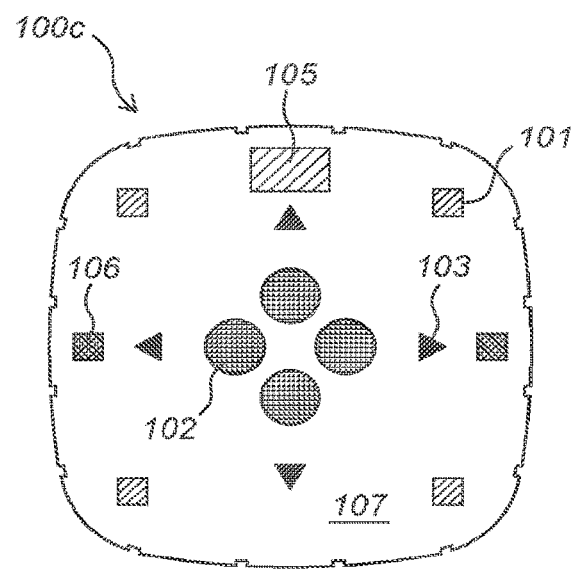
Figure 1D:
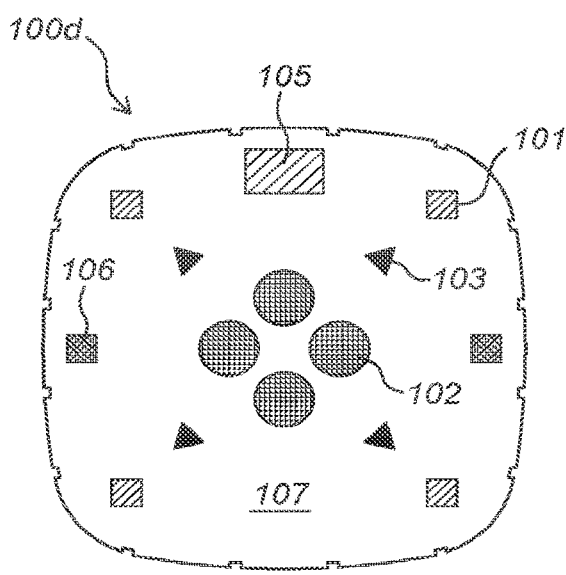
Figure 1E:
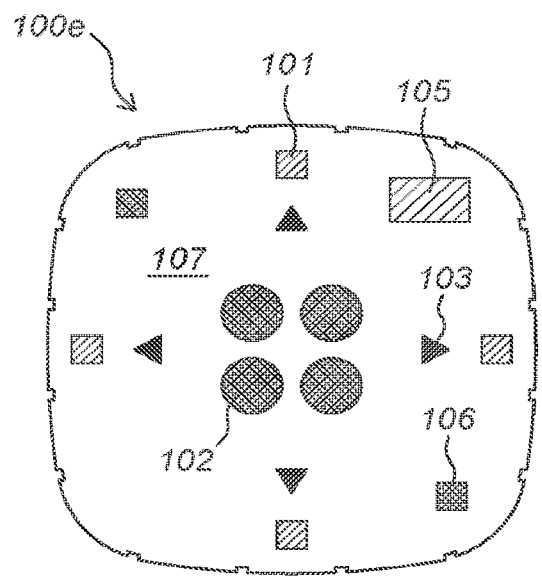
Figure 1F:
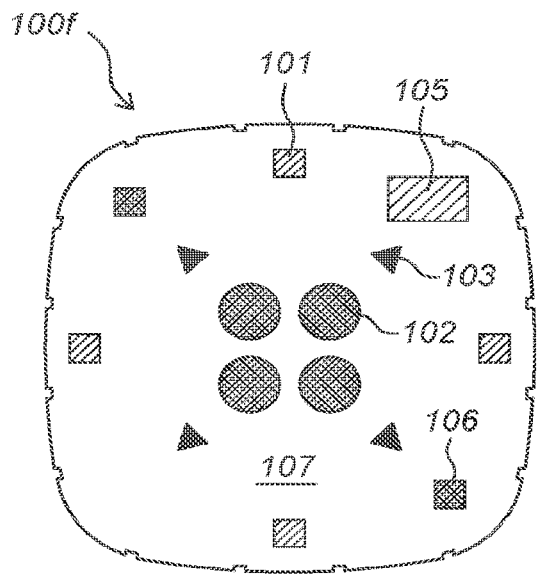
Figure 1G:
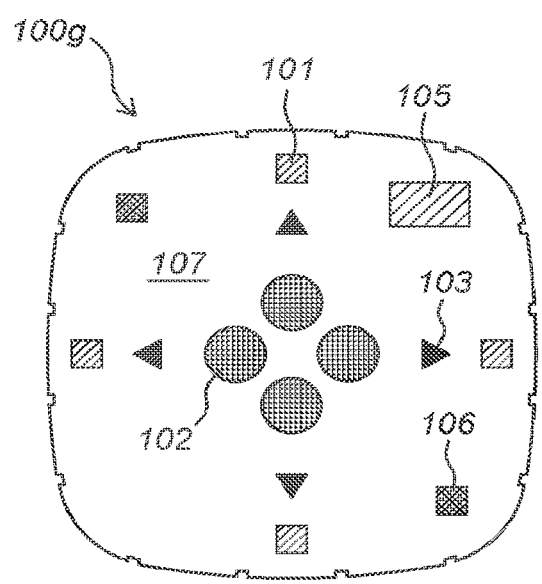
Figure 1H:
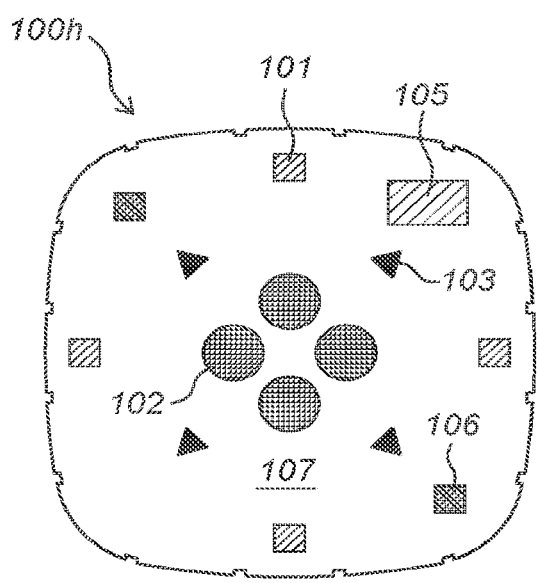
Figure 1M:
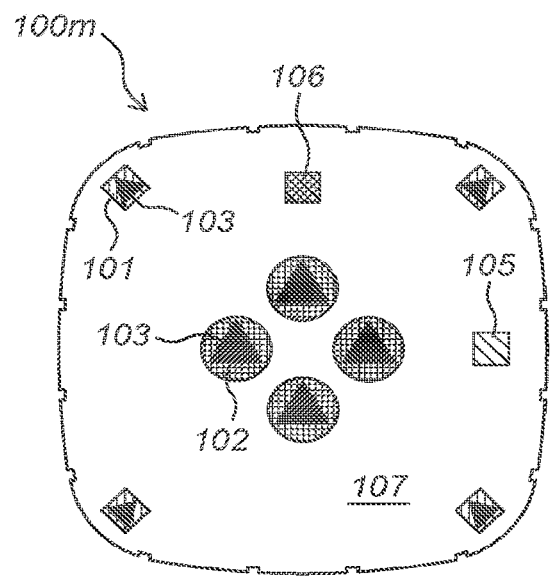
Figure 1N:
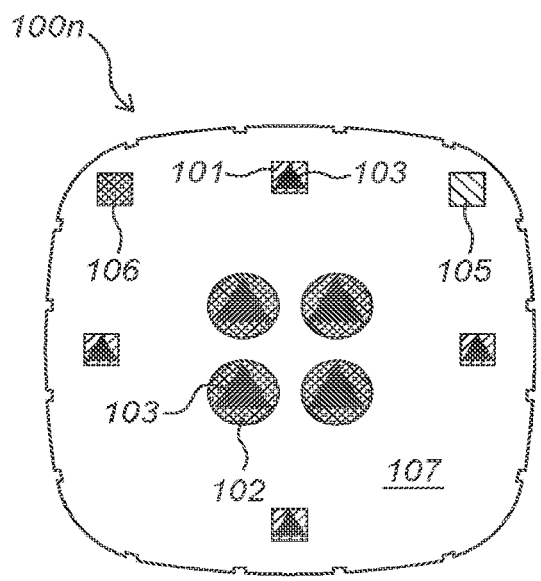

| | | | |
|---|---|---|---|
| 2016/0049736 A1* | 2/2016 | Liu | H01Q 21/28 |
| | | | 343/893 |
| 2016/0064830 A1* | 3/2016 | Jervis | H01Q 9/285 |
| | | | 343/798 |
| 2016/0204512 A1* | 7/2016 | Ying | H01Q 5/321 |
| | | | 343/893 |
| 2017/0250462 A1* | 8/2017 | Li | H01Q 21/26 |
| 2017/0310014 A1* | 10/2017 | Liu | H01Q 1/50 |
| 2018/0277928 A1* | 9/2018 | Hartenstein | H01Q 1/2291 |
| 2020/0194882 A1* | 6/2020 | Kim | H01Q 1/3208 |
| 2020/0303807 A1* | 9/2020 | Caratelli | H01Q 1/2291 |
| 2021/0320406 A1* | 10/2021 | Chen | H01Q 21/062 |

* cited by examiner

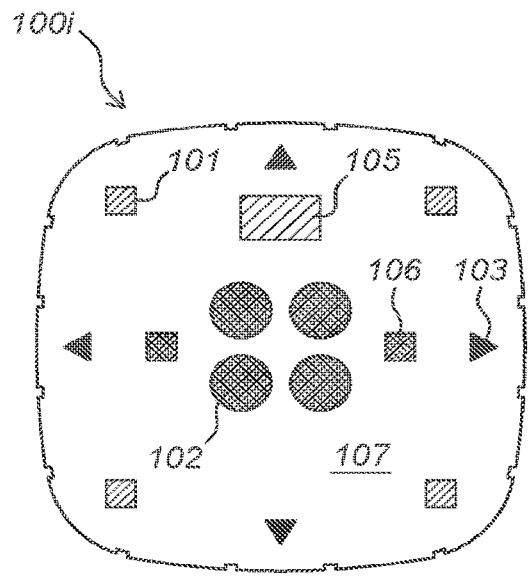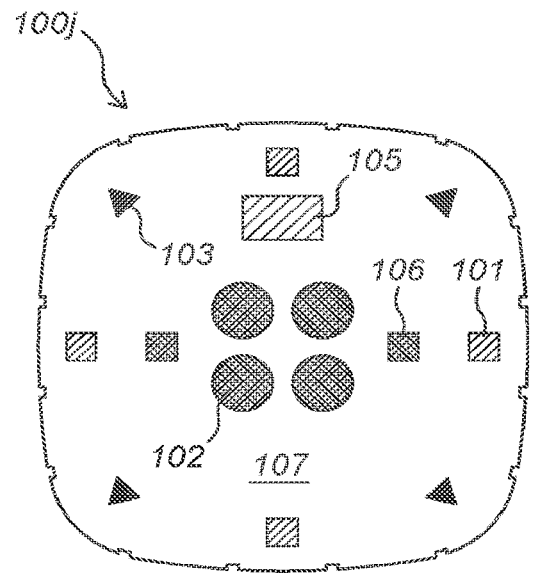
Fig. 1i
Fig. 1j
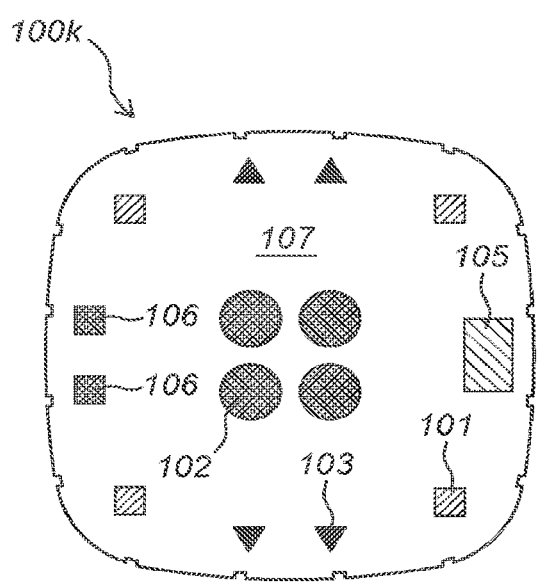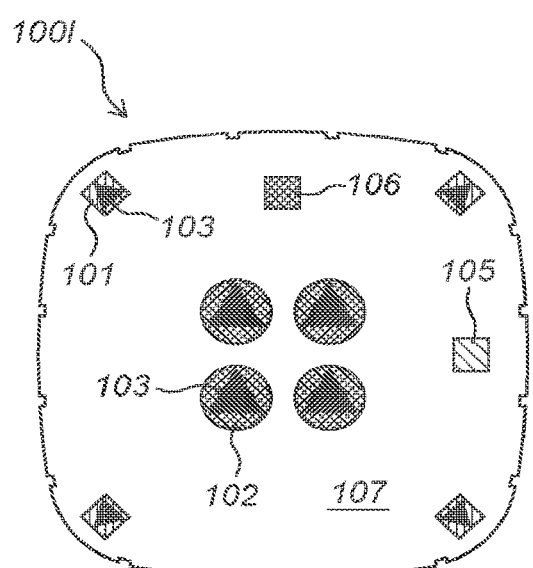
Fig. 1k
Fig. 1l

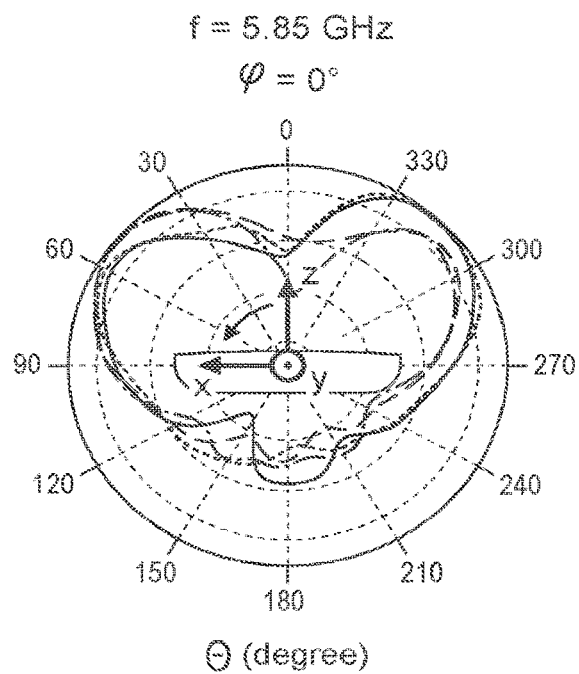
Fig. 14a
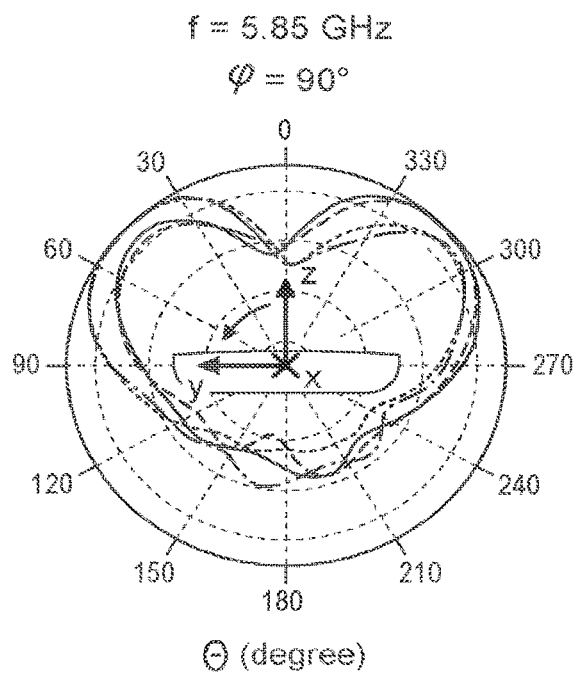
Fig. 14b
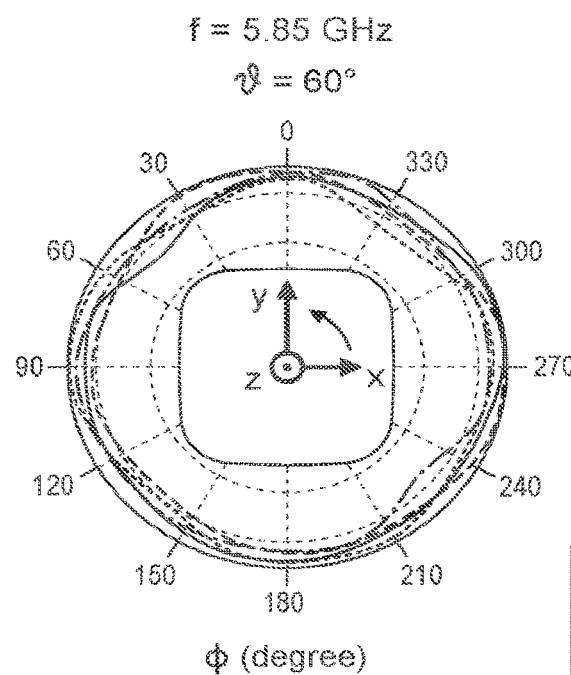
Fig. 14c
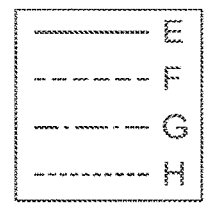

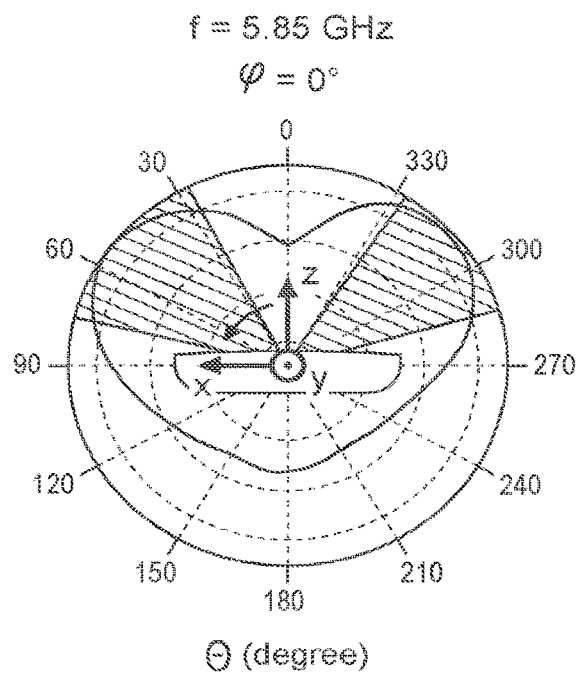
Fig. 15a
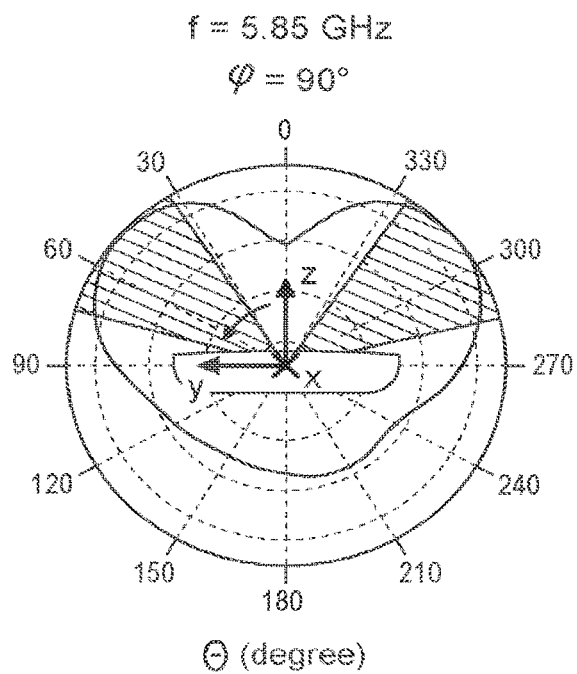
Fig. 15b
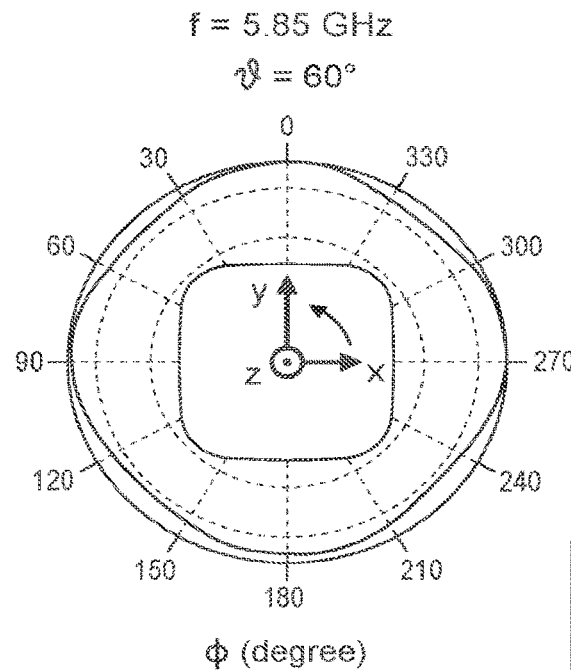
Fig. 15c
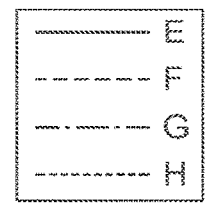

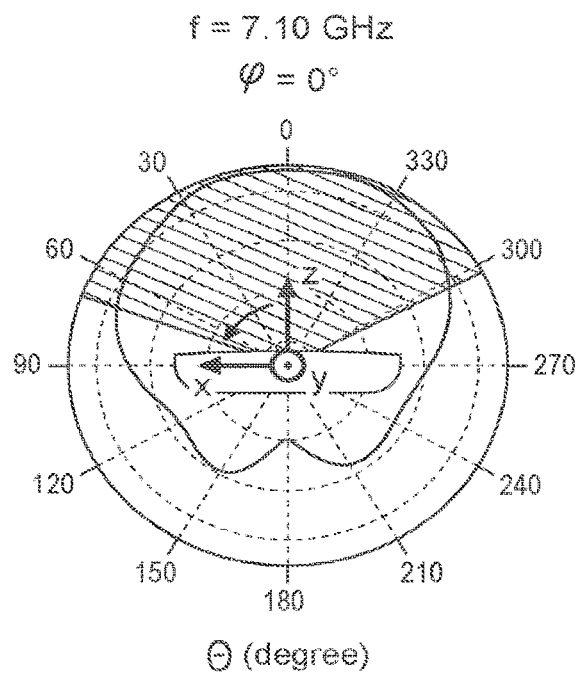
Fig. 21a
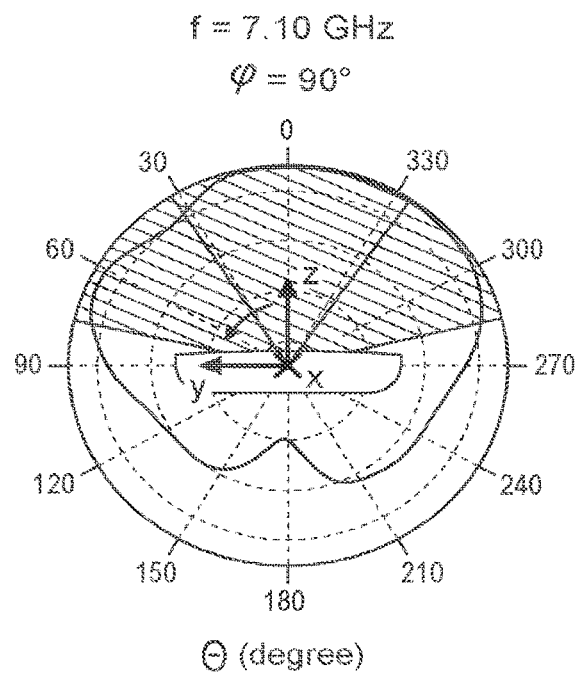
Fig. 21b
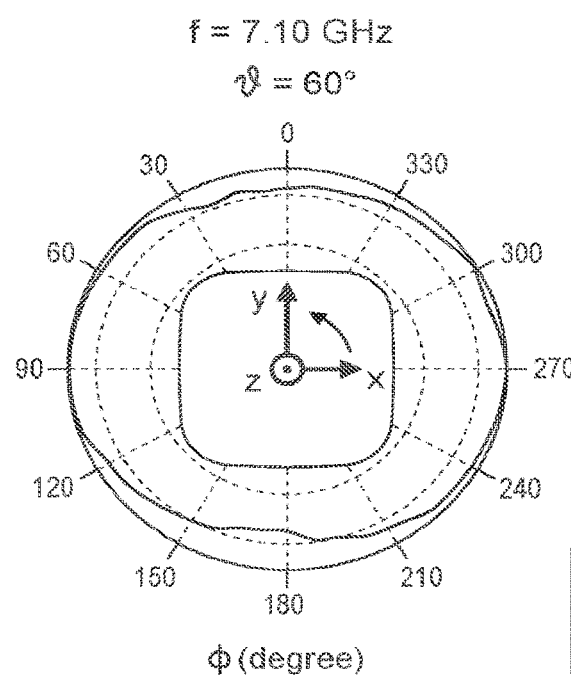
Fig. 21c
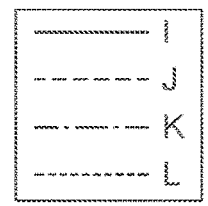

MIMO ANTENNA SYSTEM, WIRELESS DEVICE, AND WIRELESS COMMUNICATION SYSTEM

The invention relates to a MIMO antenna system for IEEE 802.11 WiFi communications. The invention also relates to a wireless device, such as a wireless access point (AP), a router, a gateway, and/or a bridge, comprising at least one antenna system according to the invention. The invention further relates to a wireless communication system, comprising a plurality of antenna systems according to the invention, and, preferably, a plurality of wireless devices according to the invention.

802.11b standard uses frequencies between 2.4 GHz and 2.495 GHz of the electromagnetic spectrum (the "2.4 GHz band") and allows users to transfer data at speeds up to 11 Mbit/sec. The IEEE 802.11a standard extends the IEEE 802.11b standard to frequencies between 5.15 GHz and 5.875 GHz (the "5 GHz band") and allows data to be exchanged at even faster rates (up to 54 Mbit/sec), but at a shorter operating range than does IEEE 802.11b. And the IEEE 802.11g standard is an extension to IEEE 802.11b. IEEE 802.11g still uses the 2.4 GHz band, but broadens IEEE 802.11b system data rates to 54 Mbps by using OFDM (orthogonal frequency division multiplexing) technology.

IEEE 802.11ax, which is on the horizon, and which is also known as High-Efficiency Wireless (HEW), is a Wireless Local Area Network standard in the IEEE 802.11 set of specifications. The wireless network technology is also labelled as Wi-Fi 6 by Wi-Fi Alliance. IEEE 802.11ax is designed to operate in the already existing 2.4 GHz and 5 GHz spectrums and it will incorporate additional bands between 1 and 7 GHz as they become available. IEEE 802.11ax lets access points support more clients in dense environments and provide a better experience for typical wireless LAN networks. It also powers more predictable performance for advanced applications such as 4K video, Ultra HD, wireless office, and Internet of Things (IoT). Flexible wake-up time scheduling lets client devices sleep much longer than with IEEE 802.11ac, and wake up to less contention, extending the battery life of smart phones, IoT, and other devices. Although conventional dual-band Wi-Fi antennas are suitable—to some extent—for IEEE 802.11ax applications, a more careful and detailed antenna design is needed since the system throughput, the radio coverage, and return loss of the conventional Wi-Fi antenna is relatively poor. Moreover, in order to enable simultaneous transmit and receive operation in next-generation IEEE 802.11ax WLANs, dedicated antenna solutions are needed that feature extremely reduced level of parasitic electromagnetic coupling between different antenna pairs in combination with high efficiency and return loss characteristics, as well as low-gain properties and uniformity of radio coverage.

It is an objective of the invention to provide an improved antenna system which is more suitable for Wi-Fi applications based on the IEEE 802.11ax protocol or future extensions, such as the IEEE 802.11be protocol.

The aforementioned objective can be achieved by providing a MIMO antenna system according to the preamble, comprising: a conductive ground plane, a first MIMO pair of, preferably vertically polarized, first antennas, mounted onto and/or configured to co-act with a top surface of said ground plane, and configured to operate in the 5 GHz frequency band and/or the 2.4 GHz frequency band, and a second MIMO pair of, preferably horizontally polarized, second antennas mounted on and/or configured to co-act with the top surface of said ground plane, and configured to operate in the 5 GHz frequency band and/or the 2.4 GHz frequency band, and a third MIMO pair of third antennas mounted onto and/or configured to co-act with the top surface of said ground plane, and configured to operate in the 6 GHz frequency band.

The antenna system according to the invention is configured to operate in at least three frequency bands: the 2.4 GHz band, the 5 GHz band (both defined above), and additionally the 6 GHz band, and optionally the 1 GHz band. The "6 GHz band" includes frequencies between 5.925 GHz and 7.125 GHZ (the "6 GHz band"). The antenna system preferably comprises a single ground plane which is configured to co-act with the first antennas, the second antennas, and the third antennas. By allowing the tri-band antenna system to operate also in the 6 GHz band, 1.2 GHz of additional spectrum is available for data transfer. This allows data to be exchanged at even faster rates (up to 9607.8 Mbit/sec). The peak data rates achievable using such large overall spectrum can rival those achieved in the millimeter wave (mmWave) bands. However, devices using the 6 GHz bands can achieve these data rates without the challenges encountered in the mmWave bands, such as high propagation losses, sensitivity to blockage, et cetera. Furthermore, the spectrum in the 6 GHz band is promising in terms of enabling features and mechanisms that can support QoS-sensitive applications, and, moreover, is suitable to allow to the radio access technology (RAT) IEEE 802.11ax to be further optimized. For example, by means of the antenna system according to the invention, minimal cross-pair isolation >43 dB between the first MIMO pair and the second MIMO pair can be obtained, and >35 dB between the first MIMO pair and the third MIMO pair, as well as between the second MIMO pair and the third MIMO pair, can be obtained. Antenna gain ripple levels typically <8 dB along the azimuthal plane can be realized by using the antenna system according to the invention, and moreover, an excellent return loss (VSWR<1.8:1) can be achieved, and a very good total efficiency (typically >60% including feeding cable losses), and reduced peak realized gain (<6 dBi) over each operational frequency band. Further embodiments of the antenna system will be presented below. The definition of the sub 1 GHZ frequency band may vary per country, as defined in IEEE 802.11ah, but it is typically situated in between 755 MHz and 928 MHz. The first antennas and/or second antennas may be configured to operate in said 1 GHz band.

It may be preferred that the first antennas, the second antennas, and the third antennas are separate antennas. It is also imaginable, and sometimes preferable, that the first MIMO pair of first antennas and at least a part of said third MIMO pair of third antennas are mutually integrated, wherein a plurality of first antennas is configured to operate in the 6 GHz frequency band. It is also imaginable, alternatively or additionally, that the second MIMO pair of second antennas and at least a part of said third MIMO pair of third antennas are mutually integrated, wherein a plurality of second antennas is configured to operate in the 6 GHZ frequency band. The antenna integration typically leads to less complex design, less components, consequently and a less laborious and less costly production process.

Preferably, the antennas of at least two different MIMO pairs are polarized in different directions. Differently oriented polarized electromagnetic waves are physically and mathematically distinct and so can be used to send a plurality of streams of independent data and/or allow for enabling best isolation between separate MIMO pairs. Preferably, each antenna is polarized in one of the following directions: circular, elliptical, or linear, in particular horizontal or vertical, or combinations thereof. Horizontal and vertical dual polarization may be replaced by slant polarization in which two linearly polarized antennas radiate at e.g. 45-degree angles (+45 degrees and −45 degrees) from horizontal and vertical, being midway between the two fundamental polarization angles. It is noted that slant polarization angles do not have to be +45 degrees or −45 degrees necessarily; other angles may also be applied, dependent on the specific application of the antenna (system). Preferably, the first antennas of the first MIMO pair are vertically polarized. Preferably, the second antennas of the second MIMO pair are horizontally polarized. Preferably, the third antennas of the third MIMO pair are vertically polarized. The high-performance MIMO antenna system allows an architecture with tri-band capability and >43 dB cross-pair isolation for supporting Rx desensitization levels, in combination to reduced <8 dB gain ripple characteristics for enhanced uniformity of radiation and TPUT without blind spots.

In a preferred embodiment, at least one antenna is mounted on the ground plane. It is imaginable that each antenna is mounted on the ground plane. It is also conceivable that the antenna system comprises a cover, preferably a radome, configured to at least partially cover the antennas of the antenna system, wherein at least one antenna is affixed to the cover. The cover is typically made of a dielectric material, such as plastic. The cover may be part of a housing of the antenna system, which housing preferably encloses (and protects) the ground plane and the antennas. The cover preferably entirely covers the ground plane and the antennas. In case one or more, and optionally each, antenna is affixed to the cover, the fixation is preferably such that, in closed state of the cover, the antennas are allowed to (electromagnetically) co-act with the ground plane. It is imaginable that one or more antennas are affixed to the cover, and that in closed state of the cover, these one or more antennas make physical contact with the ground plane.

In a preferred embodiment, the first MIMO pair encloses the second MIMO pair. This means that the surface defined by the first MIMO pair enclosed the antennas of the second MIMO pair. Preferably, the first MIMO pair encloses the third MIMO pair, and the third MIMO pair encloses the second MIMO pair. In this manner, the three MIMO pairs can be oriented concentrically and/or coaxially with respect to each other. Such embodiment may provide further improved isolation between said MIMO pairs. Typically, the antennas of the first MIMO pair are located at opposing edges of the ground plane and/or located in a peripheral zone of the ground plane, while the antennas of the second MIMO pair are positioned in a central zone of the ground plane. The antennas of the first MIMO pair may for example be located substantially at the circumference of the ground plane. It is conceivable that the first antennas are distributed along a peripheral zone of the ground plane. Hence, such embodiment substantially differs from an interleaved antenna arrangement. The antennas of the second MIMO pair are preferably substantially grouped at a central zone of the ground plane. Preferably, at least two adjacent first antennas and/or second antennas and/or third antennas are positioned in the line of sight with each other. The distance in between a first antenna or third antenna, and an adjacent second antenna preferably exceeds the distance between adjacent second antennas. Hence, the second antennas are preferably located relatively close to each other while the first antennas and/or third antennas are preferably located more distant from each other.

In a preferred embodiment, the antennas of at least one MIMO pair mutually define a polygonal shape, preferably a convex polygonal shape, more preferably a regular convex polygonal shape, most preferably an equilateral and/or equiangular convex polygonal shape. Examples of such a polygonal shape are a square, a diamond, a triangle, and an (oblong) rectangle. Preferably, the antennas of the first MIMO pair together define a first simple polygon, and the antennas of the second MIMO pair together define a second simple polygon. Optionally, the antennas of the third MIMO pair together define a third simple polygon. Preferably, the size and/or orientation of at least two MIMO pair related polygonal shapes mutually differ. A plane region or surface area defined by said first simple polygon is typically larger than a plane region or surface area defined by said second simple polygon. Preferably, the second simple polygon is situated entirely within the (outline of the) second polygon, more preferably without any intersecting or coinciding borders. This will result into an uninterleaved (disentangled or unweaved), grouped MIMO pair configuration rather than into a typically undesired interleaved configuration of MIMO pairs, which reduces the coupling between the MIMO pairs while allowing the first MIMO pair of vertically polarized first antennas and the second MIMO pair of horizontally polarized second antennas to operate in a rather unhindered manner, thus enhancing the overall antenna system performance.

Preferably, a polygonal shape defined by a MIMO pair has a different orientation compared to a polygonal shape defined by at least one other MIMO pair. This means that these polygonal shapes have an offset orientation and are typically rotated with respect to each other (around a virtual common central axis). Here, tangents of the different polygonal shapes typically enclose an angle, preferably an angle which is 30, 45, 60, or 75 degrees.

In a preferred embodiment, the antenna system comprises a plurality of the first feeding cables, wherein each first feeding cable is connected to a first antenna, a plurality of the second feeding cables, wherein each second feeding cable is connected to a second antenna, wherein the top surface of the ground plane is provided with a plurality of cable channels, wherein each cable channel is configured to accommodate at least a part of at least one feeding cable, and wherein each cable channel extends from an antenna to a cable feed-through opening applied in the ground plane. In case the third antennas are separate physical antennas compared to the first antennas and second antennas, it is preferred that the antenna system also comprises a plurality of third feeding cables, wherein each third feeding cable is connected to a third antenna, wherein the third feeding cables are at least partially accommodated in one or more of said cable channels.

The application of cable channels (grooves) in the ground plane allows the feeding cables to be accommodated at least partially within the ground plane. During operation, feeding cables will typically cause undesired parasitic radiation, which could lead to undesired cross-talk between antennas, and which could seriously affect the antenna system performance. This negative effect will become greater in case more cables are used, and in case of a MIMO antenna system typically a considerable number of a cables is used to connect all the antennas. By housing the feeding cables at least partially within the conductive ground plane, this undesired side effect could be reduced significantly, and could even be eliminated completely, which is in great favour of the antenna isolation, and which significantly improves the performance of the antenna system according to the invention. Hence, with the antenna system according to the invention an extremely high antenna isolation can be achieved without compromising uniformity of radiation and efficiency.

Preferably, cable channels comprise: a plurality of first cable channels, wherein each first cable channel is provided with at least a part of at least one first feeding cable, and a plurality of second cable channels, wherein each second cable channel is provided with at least a part of at least one second feeding cable, and, optionally, a plurality of third cable channels, wherein each third cable channel is provided with at least a part of at least one third feeding cable. Preferably, at least two, and preferably all, first cable channels extend to a first cable feed-through opening applied in the ground plane. Preferably, at least two, and preferably all, second cable channels extend to a second cable feed-through opening applied in the ground plane. Preferably, at least two, and preferably all, third cable channels extend to a third cable feed-through opening applied in the ground plane. The first cable feed-through opening and the second feed-through opening and (if applied) the third feed-through opening may be the same feed-through opening. However, in practice the first cable feed-through opening and the second cable feed-through opening and the third cable feed-through are positioned at a distance from each other. The first and/or second and/o third cable feed-through opening may be fully enclosed (surrounded) by the ground plane material. However, it is also conceivable that the first and/or second and/or third cable feed-through opening are positioned at a peripheral edge of the ground plane, wherein the first and/or second and/or third cable feed-through may be formed by a cut-away portion of the ground plane.

The depth of at least one cable channel is preferably substantially equal to or exceeds the diameter of the feeding cable accommodated within said cable channel. This allows (segments of) the feeding cable(s) to be accommodated completely within a space enclosed and/or defined by the ground plane. Preferably, at least one cable channel is at least partially curved. By using a curved channel, the use of perpendicular channel segments, which could damage the feeding cable(s) by excessive bending, may be prevented.

It is preferable in case at least one feeding cable is locked in place within a cable channel. This means that the feeding cable is locked and/or fixed and/or secured and/or clamped within the channel to prevent undesired loosening (disconnection) of the feeding cable from the channel. This locking in place of at least one feeding cable within a cable channel can be realized by the cable channel itself. This may e.g. be realized by applying a channel opening which is (slightly) narrower than the feeding cable diameter. Alternatively and/or additionally, at least one feeding cable may be locked in place within a cable channel by using at least one adhesive strip (tape) covering the cable channel at least partially. At least one terminal portion of at least one cable channel facing at least one antenna is preferably widened to allow the feeding cable to be manoeuvred in an improved manner to facilitate connection of the feeding cable with the antenna. Preferably, each feeding cable is formed by a coaxial cable, for example with a typical diameter of about 0.81 mm.

Typically a, or each, cable channel is configured to accommodate at least a part of an individual feeding cable, or part thereof. The accommodation of multiple feeding cables in a single cable channel may negatively favour parasitic electromagnetic coupling phenomena and, thereby, affect the antenna system performance.

Preferably, at least one cable channel provides a substantially linear path from a first or second or third antenna towards a respectively first or second or third cable feed-through opening. Such embodiment is beneficial as it enables the use of a relatively short cable. The longer the cable, the larger the losses experienced by the radio-frequency (RF) signal.

Preferably, the first MIMO pair comprises at least four first antennas. As the term MIMO is defined as 'Multiple Input Multiple Output', a MIMO configuration requires simultaneously operative multiple inputs and multiple outputs using antennas. A single MIMO antenna has one input antenna and one output antenna to be simultaneously operative. And for a MIMO pair, this means at least two input antennas and at least two output antennas for a total of said at least four first antennas. Preferably, the second MIMO pair comprises at least four second antennas in the same deployment as discussed with the first MIMO pair. Preferably, the third MIMO pair comprises at least four third antennas in the same deployment as discussed with the first MIMO pair and second MIMO pair. Preferably, the first antennas are configured to operate both in the 5 GHz frequency band and the 2.4 GHz frequency band. Preferably, the second antennas are configured to operate solely in the 5 GHz frequency band.

In a preferred embodiment, the antenna system comprises at least one auxiliary vertically polarized dual-band antenna mounted onto the ground plane. This auxiliary antenna is preferably configured to operate both in the 5 GHz frequency band and the 2.4 GHz frequency band. Possibly, the auxiliary vertically polarized dual-band antenna is enclosed by at least the second MIMO pair. It is also conceivable that the auxiliary vertically polarized dual-band antenna is enclosed between two adjacent first antennas.

In a preferred embodiment, the antenna system comprises at least one auxiliary vertically polarized single-band antenna mounted onto the ground plane. This single-band antenna is preferably configured to operate within the 2.4 GHZ frequency band. Preferably, this single-band antenna is configured as Bluetooth antenna. It is conceivable that the auxiliary vertically polarized single-band antenna is enclosed between two adjacent first antennas.

The antenna system preferably comprises a printed circuit board (PCB) mounted on the bottom surface of the ground plane. Typically, an electronic circuit, including an antenna system controller (control unit), is mounted onto the PCB. Preferably, the antenna system comprises at least one heat transmission element, such as a heat pipe and/or a heat sink, mounted onto said bottom surface of the ground plane and configured to disperse heat generated by the printed circuit board (PCB). This heat may be dispersed partially from the heat transmission element(s) to the ground plane and/or the surrounding atmosphere.

In a preferred embodiment, the ground plane is provided with one or more cavities, in particular one or more circular cavities, wherein each cavity is positioned underneath (a substrate of) a second antenna, and wherein each cavity is configured to enlarge the effective distance between the second antenna and the ground plane. This feature allows a more compact design of the antenna system according to the invention.

Preferably, the antenna system comprises at least one parasitic element, preferably formed by a metallic pin and/or a diffraction post, mounted onto or in the top surface of the ground plane and positioned in between a plurality of adjacent antennas relating to different MIMO pairs, such as in between a first antenna and an adjacent second antenna. The application of parasitic elements results in the diffraction of the electromagnetic power radiated by the various antenna elements and, in this way, enhances the isolation between the different MIMO pairs while preserving a good uniformity of radio coverage. Preferably, the antenna system comprises a plurality of parasitic elements mounted onto the top surface of the ground plane, wherein in between each first antenna and each adjacent second antenna at least one parasitic element, preferably formed by a metallic pin and/or a diffraction post, is positioned.

Typically, the parasitic elements are made of a conductive material, in particular metal. Preferably the parasitic elements are made of the same material as the ground plane, and more preferably, the parasitic elements and the ground plane are integrated and/or made out of one piece of material (metal). The ground plane, including the cable channels, the cavities (if applied), and the parasitic elements (if applied), can be all be made out of the same material (typically metal), and may be made in e.g. by die casting. Suitable materials for the ground plane and the parasitic elements are, for example, stainless steel or aluminium.

It is conceivable that at least one additional MIMO pair of antennas is mounted onto the top surface of said ground plane. Dependent on the application, the antennas could either be single-band, dual-band, triple-band, or multi-band antennas. At least some of the antennas can for example be metal-stamped antennas. Preferably, at least the third antennas are metal-stamped antennas.

In a preferred embodiment of the antenna system according to the invention, each second antenna comprises: a substantially flat, dielectric substrate, a conductive central feeding point, at least three folded dipole elements applied onto an upper side of said substrate, each folded dipole element comprising: a loop-shaped first conductor including a first curved inner conductor part and a first curved outer conductor part, wherein outer ends of the first inner conductor part are connected to respective outer ends of the first outer conductor part, and a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement. Advantages of further embodiments of this specific second antenna are described extensively in NL2022790, the content of which is incorporated in this document by reference.

The invention also relates to a wireless device, such as a wireless access points (AP), a router, a gateway, and/or a bridge, comprising at least one antenna system according to the invention.

The invention further relates to a wireless communication system, comprising a plurality of antennas systems according to the invention, and, preferably, a plurality of wireless devices according to the invention.

The invention will be elucidated on the basis of non-limitative exemplary embodiments shown in the enclosed figures. In these embodiments, similar reference signs correspond to similar or equivalent features or elements.

Figure 1O:
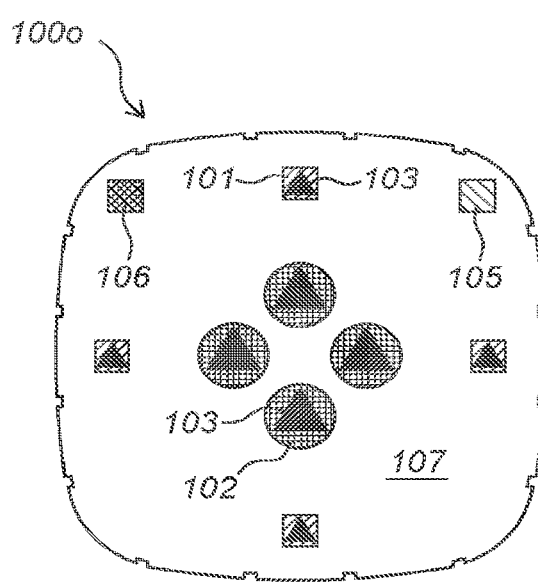

FIGS. 1a-1o show several non-limiting examples of antenna architectures for MIMO antenna systems according to the present invention. Each antenna system 100a-100o comprises a conductive ground plane 107, a first MIMO pair of first antennas 101, mounted onto and/or configured to co-act with a top surface of said ground plane 107, and configured to operate in the 5 GHz frequency band and/or the 2.4 GHz frequency band, and a second MIMO pair of second antennas 102 mounted onto and/or configured to co-act with the top surface of said ground plane 107, and configured to operate in the 5 GHz frequency band and/or the 2.4 GHz frequency band, and a third MIMO pair of third antennas 103 mounted onto and/or configured to co-act with the top surface of said ground plane 107, and configured to operate in the 6 GHz frequency band. In the shown examples, each MIMO pair comprises four antennas 101, 102, 103. Furthermore, in the shown configurations, the first MIMO and the third MIMO pair enclose the second MIMO pair. The antennas 101, 102, 103 of each MIMO pair mutually define a polygonal shape. Adjacent first antennas 101 are positioned in the line of sight with each other. The distance in between a first antenna 101 and an adjacent second antenna 102 exceeds the distance between adjacent second antennas 102. The systems 100a-100o further comprises at least one auxiliary vertically polarized dual-band antenna 106 and an auxiliary vertically polarized single-band antenna 105, preferably mounted onto the ground plane 107. Each auxiliary vertically polarized single-band antenna 105 is positioned at a peripheral edge of the ground plane 107. The auxiliary vertically polarized dual-band antenna 106 can be either positioned at a peripheral edge of the ground plane 107 or at a more central position, preferably enclosed between two adjacent first antennas 101. Where the embodiments of FIGS. 1a-1k show separate first, second and third MIMO pairs, the embodiments of FIGS. 1l-1o show that the first MIMO pair of first antennas 101 and the third MIMO pair of third antennas 103 are mutually integrated. In these embodiments, a plurality of first antennas 101 is configured to operate in the 6 GHz frequency band. For the embodiments shown in FIGS. 1l-1o, also the second MIMO pair of second antennas 102 and the third MIMO pair of third antennas 103 are mutually integrated wherefore a plurality of second antennas is preferably configured to operate in the 5 GHz and/or the 6 GHz frequency band.

Figure 2:
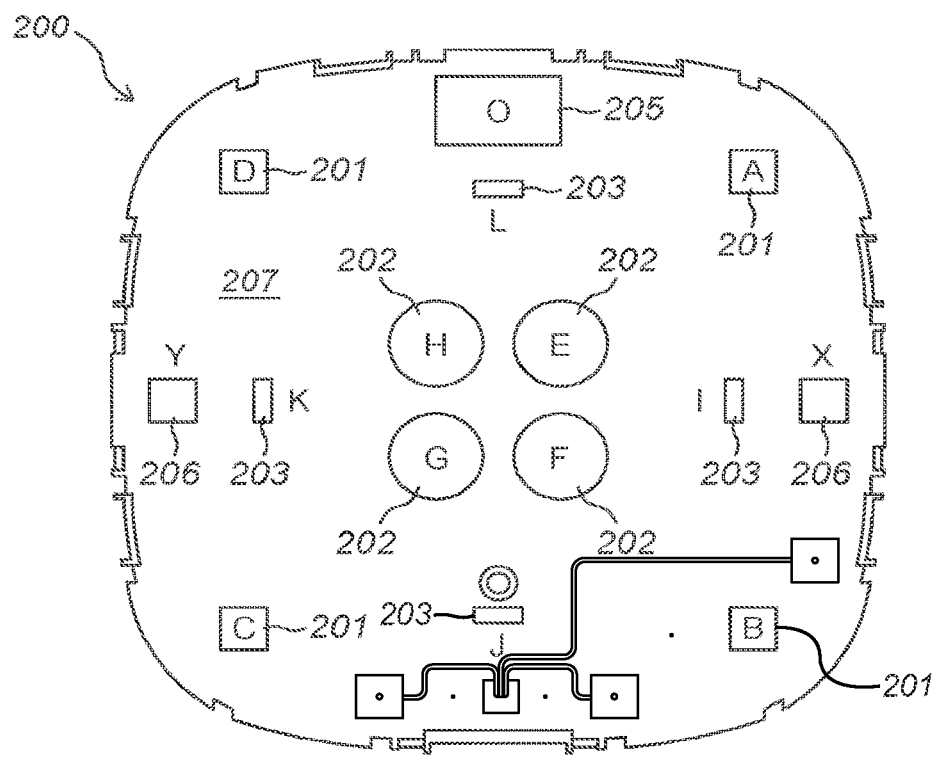

FIG. 2 shows a further possible embodiment of a Multiple-Input, Multiple-Output ("MIMO") antenna system for IEEE 802.11 WiFi communication according to the present invention. The MIMO antenna system 200 comprises a conductive ground plane 207, a first MIMO pair of vertically polarized first antennas 201, possibly mounted onto a top surface of said ground plane 107, and configured to operate in the 5 GHz frequency band and/or the 2.4 GHz frequency band, and a second MIMO pair of horizontally polarized second antennas 202 configured to operate in the 5 GHz frequency band. The system 200 further comprises a third MIMO pair of third antennas 203 mounted onto and/or configured to co-act with the top surface of said ground plane 207, and configured to operate in the 6 GHz frequency band. The first MIMO pair comprises in the shown embodiment four first antennas 201, the second MIMO pair comprises four second antennas 202 and the third MIMO pair comprises four third antennas 203. The four first antennas 201 are positioned in a substantially square configuration. The same applied to the four second antennas 202 whereas the four third antennas 203 have a substantially diamond shaped orientation. The antenna system 200 further comprises two auxiliary vertically polarized dual-band antennas 206 and an auxiliary vertically polarized single-band antenna 205 mounted onto the ground plane 207. In order to clarify the measurement results, all the antennas have a letter indication, which is useful for explanation of the experimental data shown in further figures. The top surface of the ground plane 207 may be provided with a plurality of cable channels, wherein each cable channel is configured to accommodate at least a part of at least one feeding cable (not shown).

Figure 3:
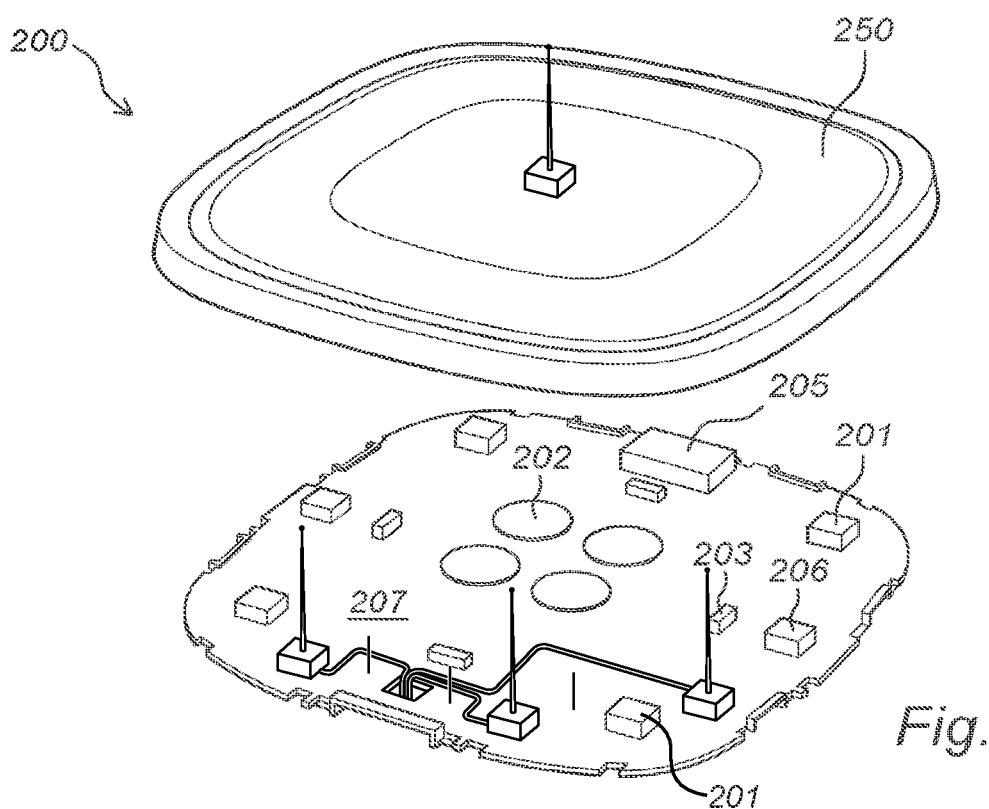

FIG. 3 shows a perspective view of the antenna system 200 as shown in FIG. 2 in combination with a cover 250 which configured to at least partially cover the antennas 201, 202, 203, 205, 206 of the antenna system 200. It is conceivable that at least one antenna 201, 202, 203, 205, 206 is mounted onto the cover 250. The cover 250 is configured to protect the antennas 201, 202, 203, 205, 206 of the antenna system 200. The cover 250 can also be referred to as radome 250. In the shown embodiment the cover 250 is made of molded plastic.

FIGS. 4a-9f are related to the first antennas A-D as shown in the previous figures. If a dotted line is indicated in the figure, the measured value should be below this threshold line. If an uninterrupted line is shown, the measured value should be above this threshold line.

Figure 4A:
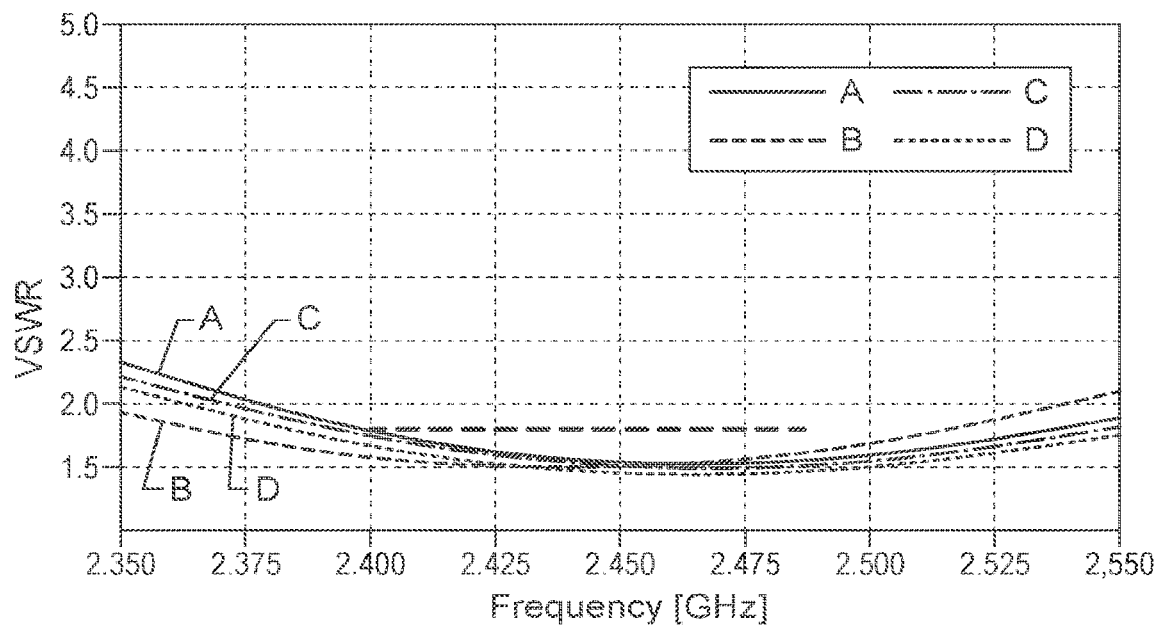
Figure 4B:
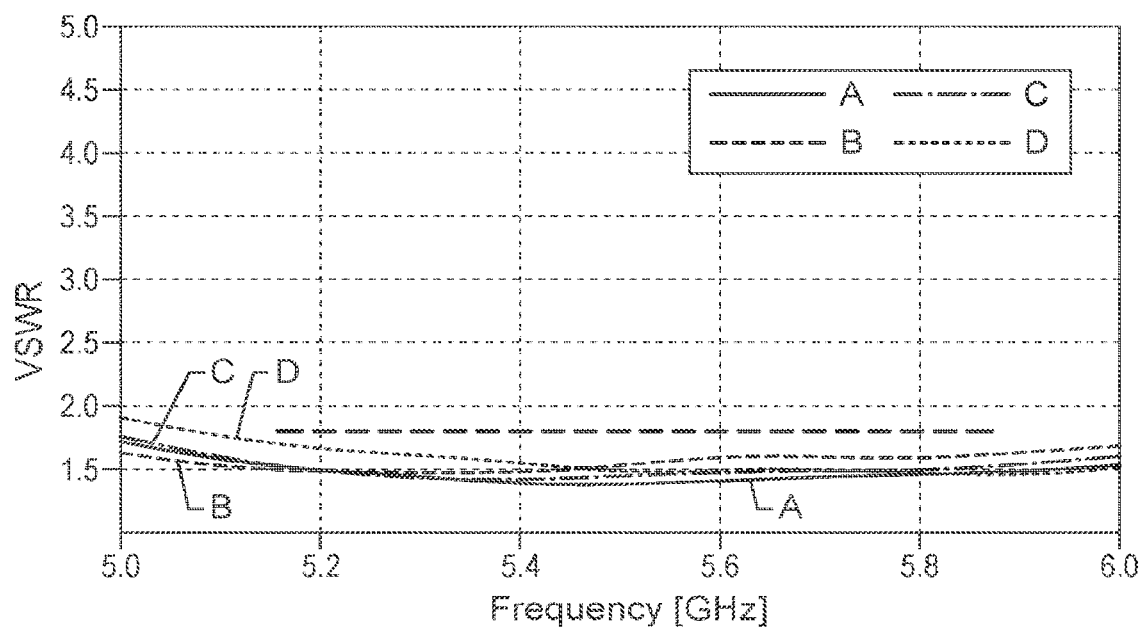

FIGS. 4a and 4b show a graph of the Voltage Standing Wave Ratio (VSWR) in relation to the frequency expressed in GHz. A performance requirement is that the VSWR is below 1.80:1 for the first antennas in the 2.4 GHz frequency band and below 1.70:1 for the first antennas in the 5 GHz frequency band. The measurements are carried out for four first antennas (A-D) used in an antenna system according to the present invention, which is shown in the previous figures. It can be seen that both for the 2.4 GHz frequency band (FIG. 6a) and the 5 GHZ frequency band (FIG. 6b) the results are below the requirement which is indicated with the dotted line. The tests are performed by using a Vector Network Analyser in the 2.4 and 5 GHz operational frequency ranges.

Figure 5A:
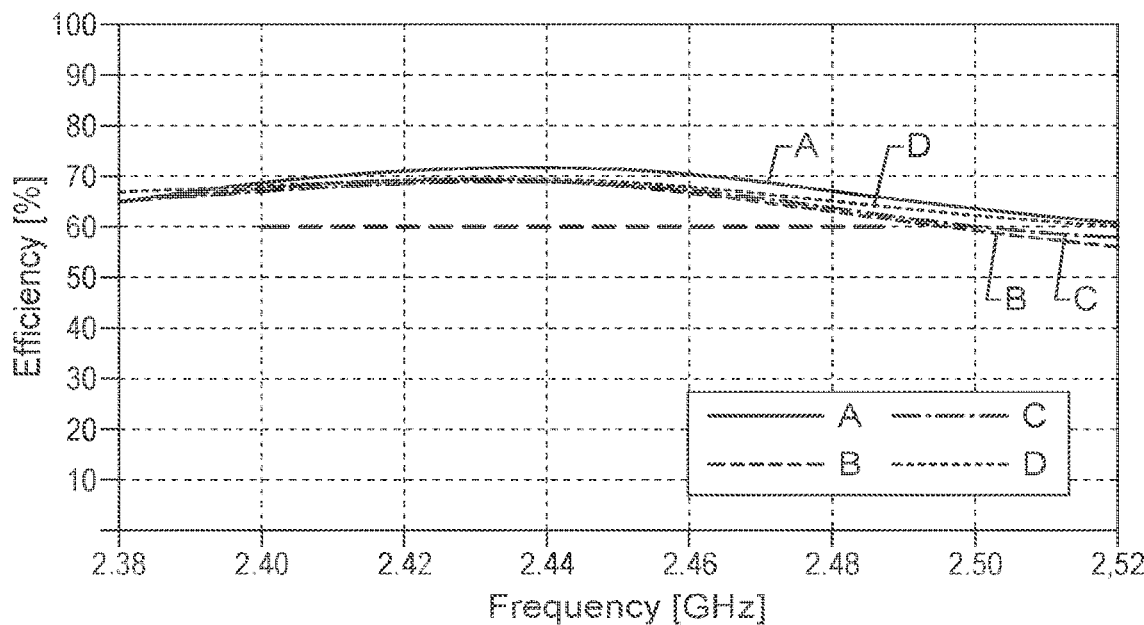
Figure 5B:
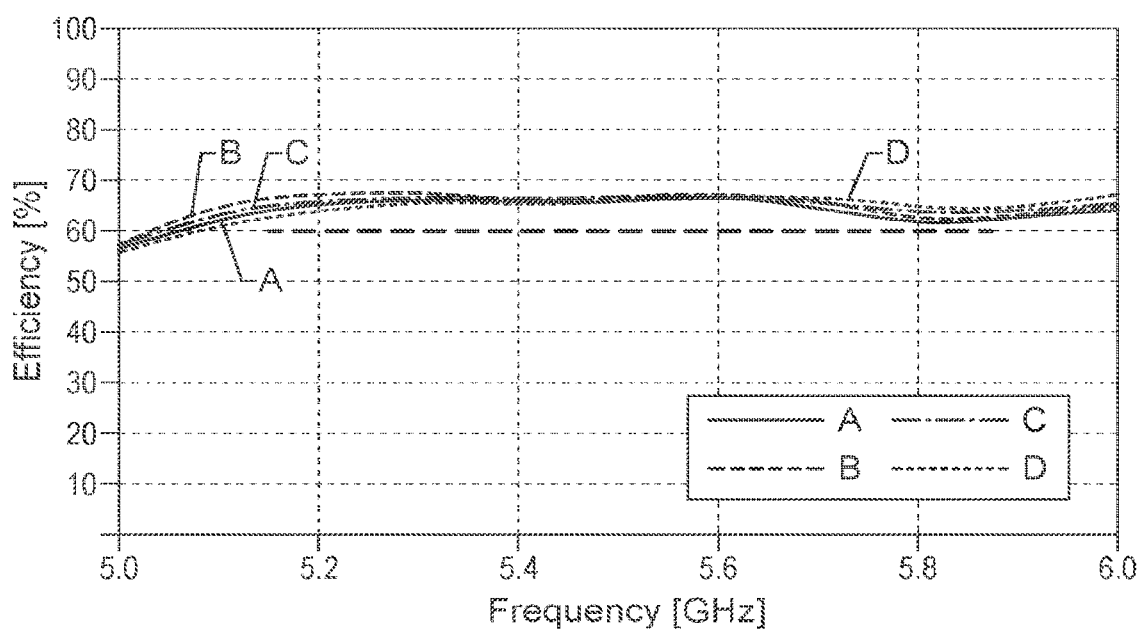

FIGS. 5a and 5b show a graph of the efficiency (expressed in %) across the used frequency bands. The uninterrupted line indicates the minimum efficiency requirement, which should be above 63% in the 2.4 GHz frequency band and above 61% in the 5 GHz frequency band. It can be observed that the total efficiency of all the first antennas used in the antenna system fulfils the requirement for both frequency bands.

Figure 6A:
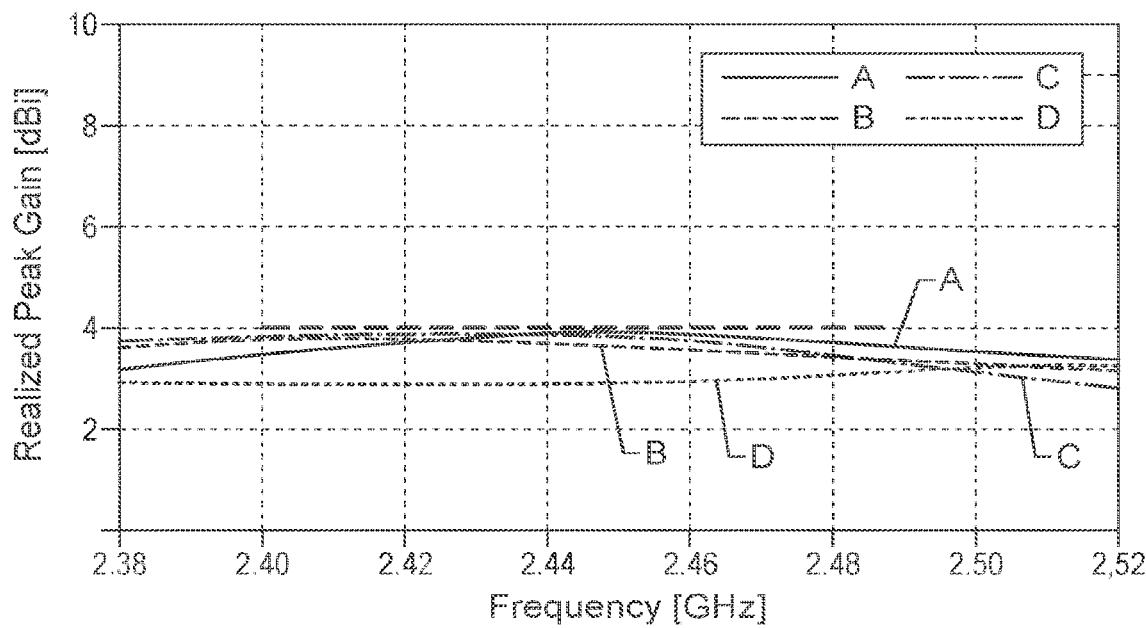
Figure 6B:
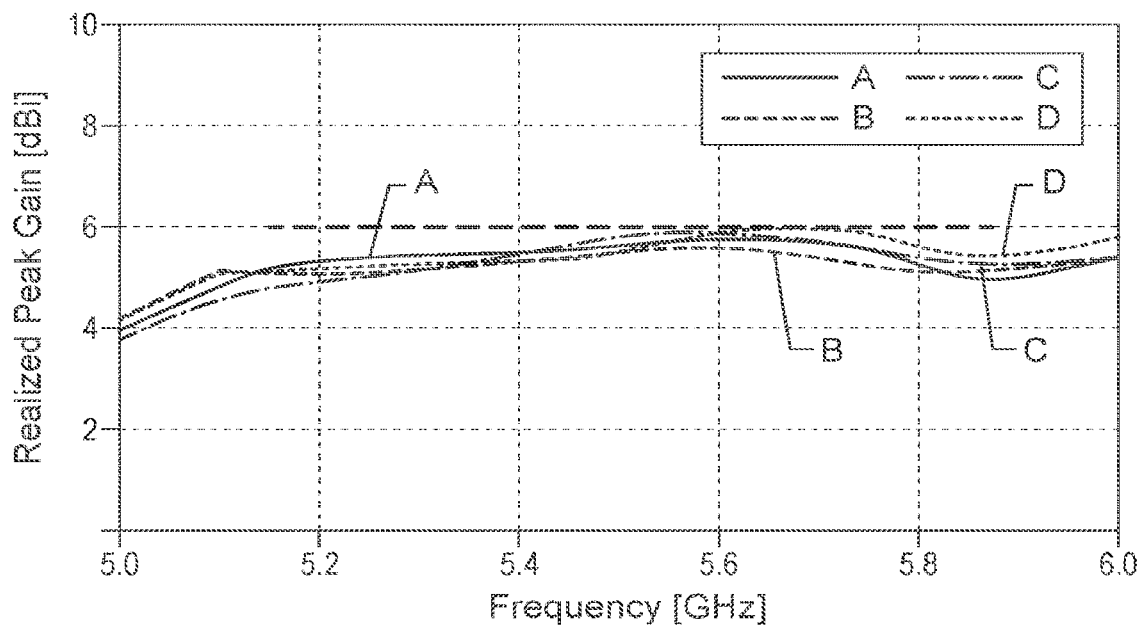

FIGS. 6a and 6b show a graph of the peak realized gain level (PRG) in both the 2.4 GHz frequency band (FIG. 6a) and the 5 GHz frequency band (FIG. 6b). It can be seen that in the low frequency band values below 4.0 dBi are measured, and that in the high frequency band values below 5.9 dBi are measured. These values are below the maximal level of 6.0 dBi specified by Federal Communications Commission (FCC) regulation.

Figure 7A:
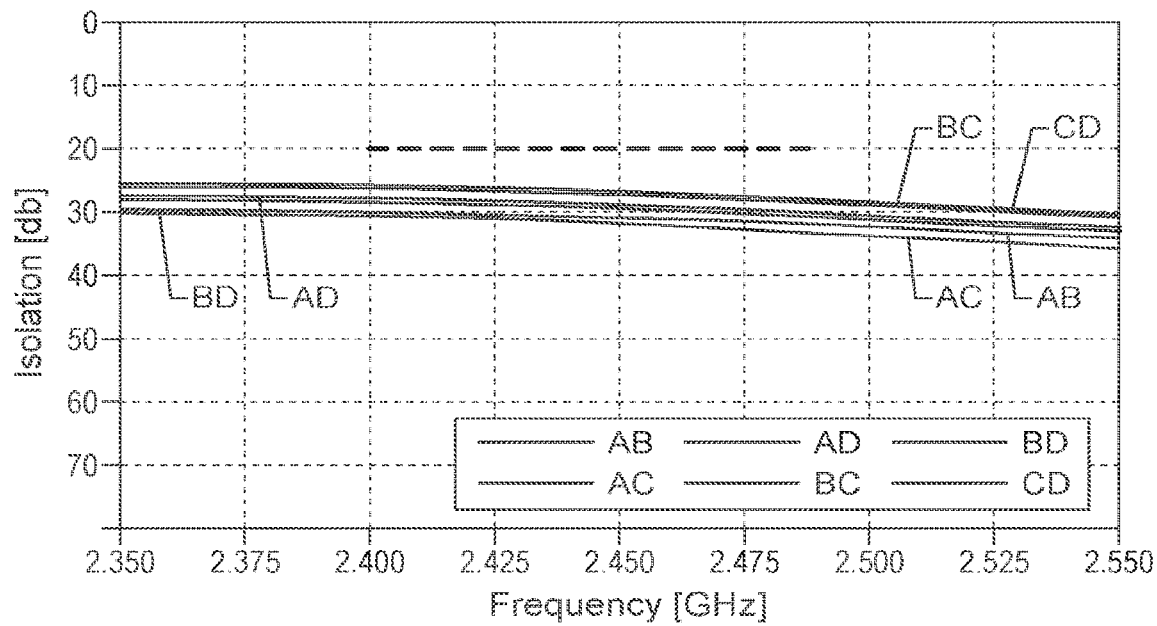
Figure 7B:
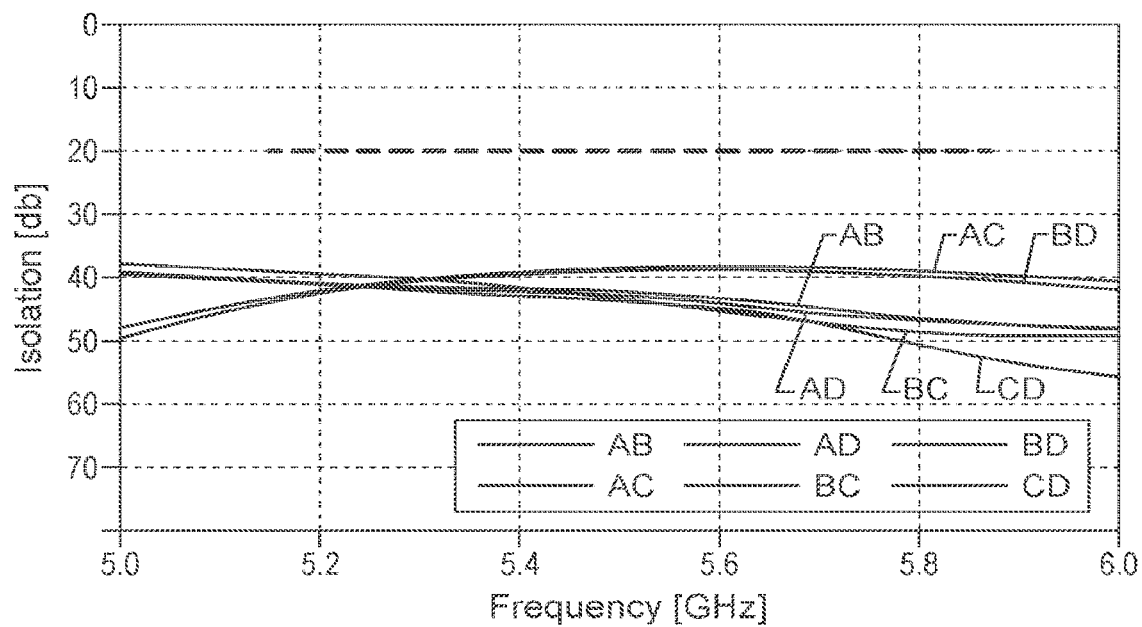
Figure 8A:
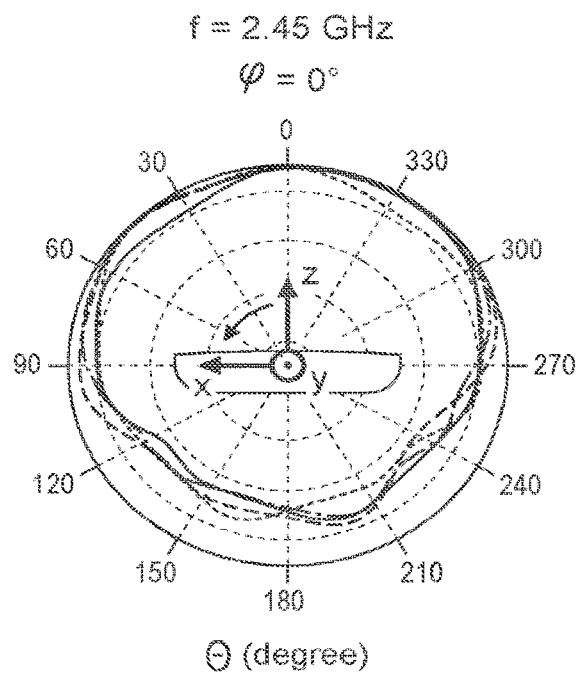
Figure 8B:
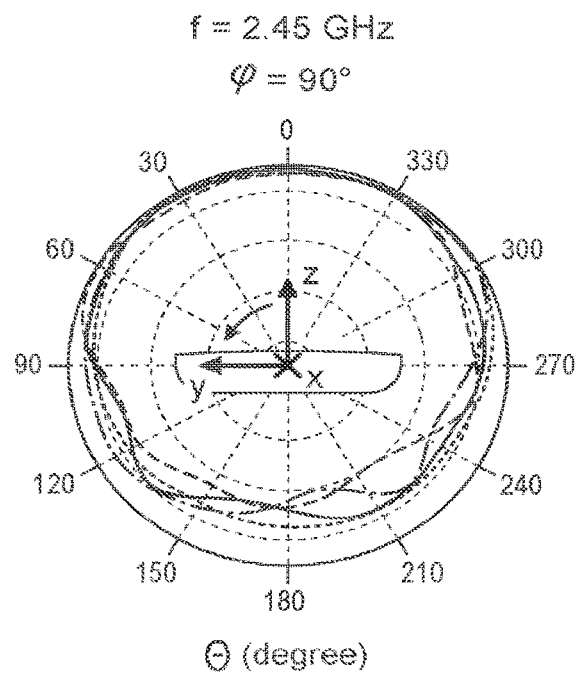
Figure 8C:
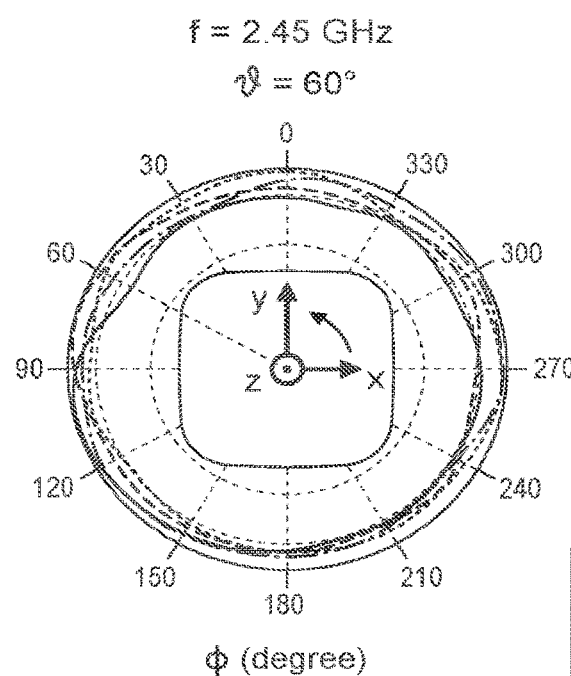
Figure 8D:
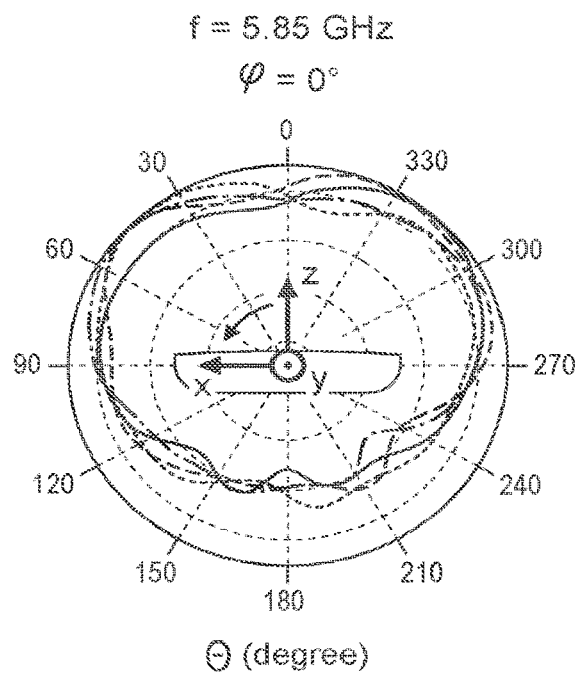
Figure 8E:
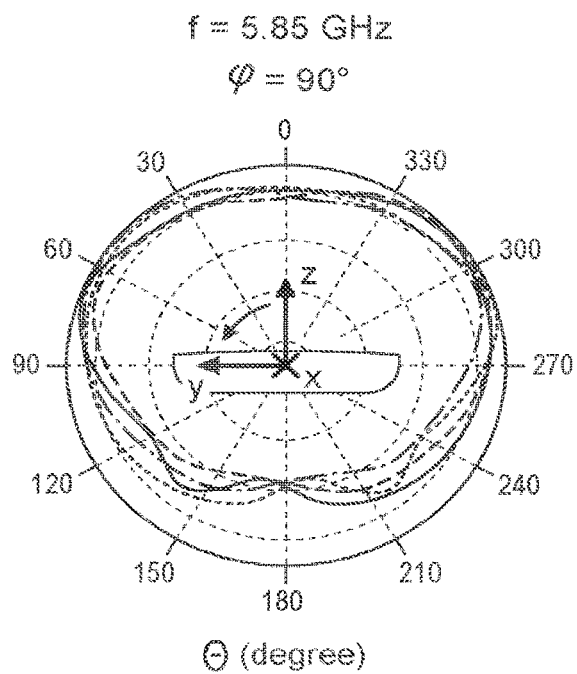
Figure 8F:
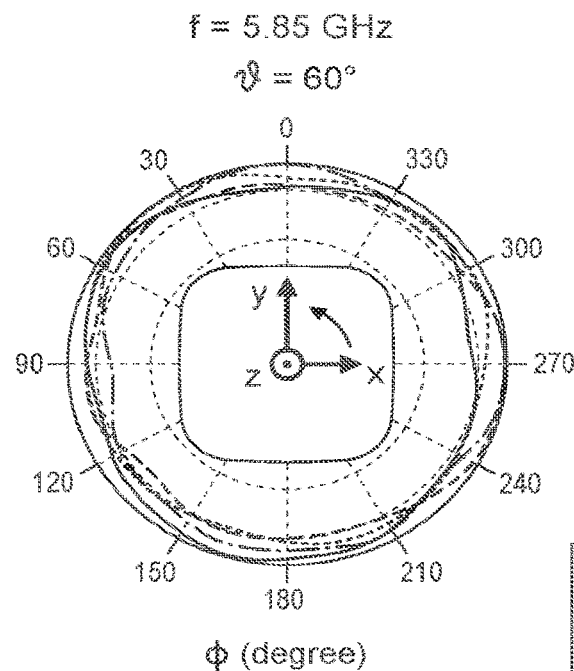
Figure 9A:
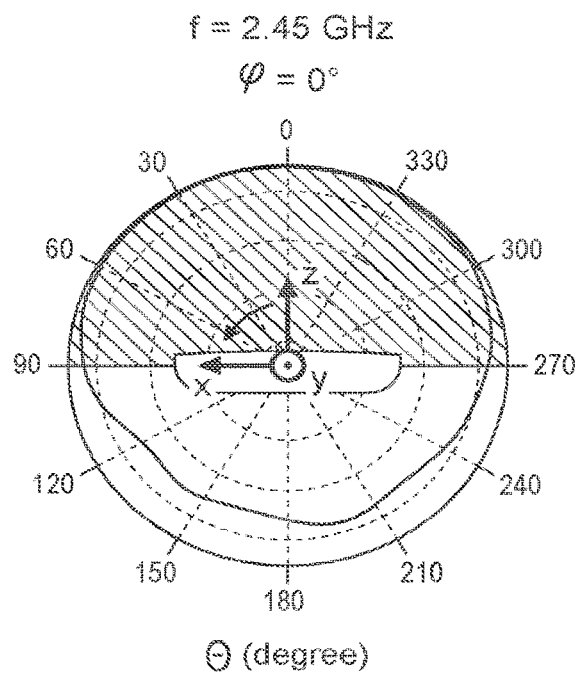
Figure 9B:
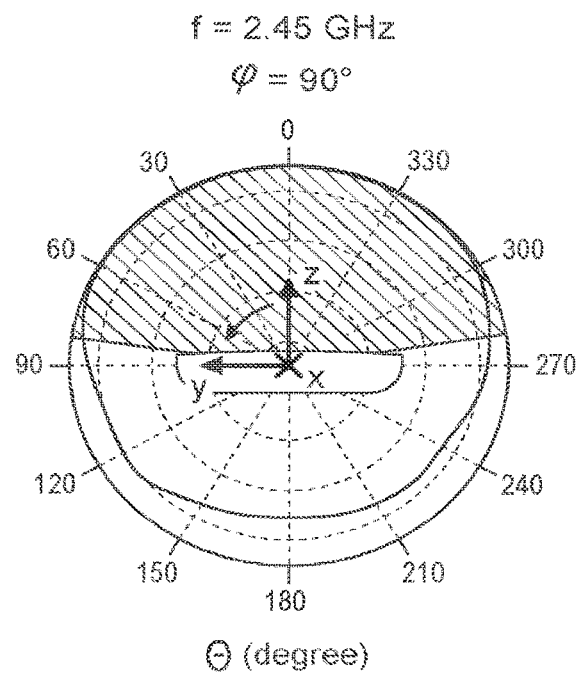
Figure 9C:
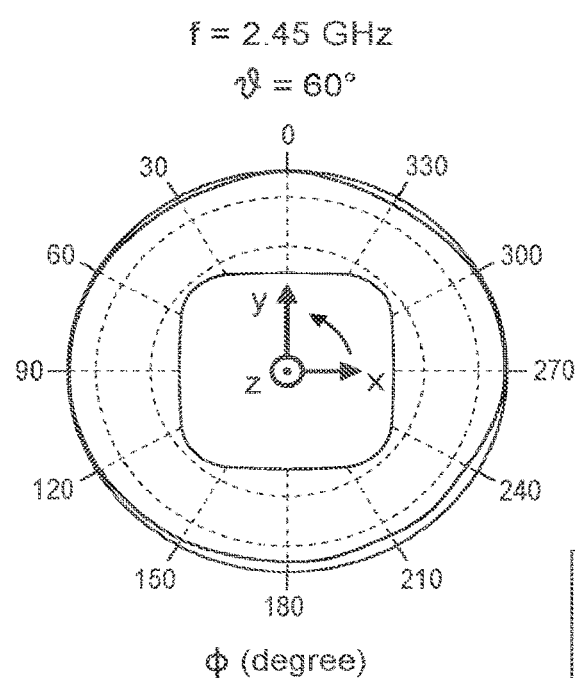
Figure 9D:
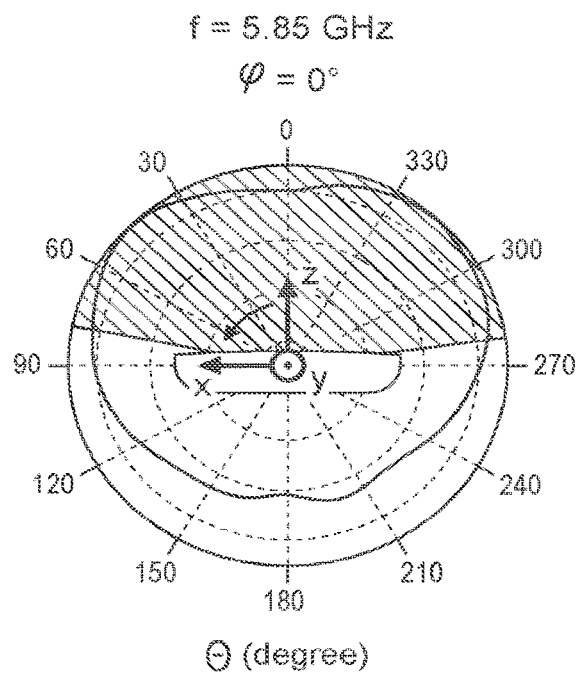
Figure 9E:
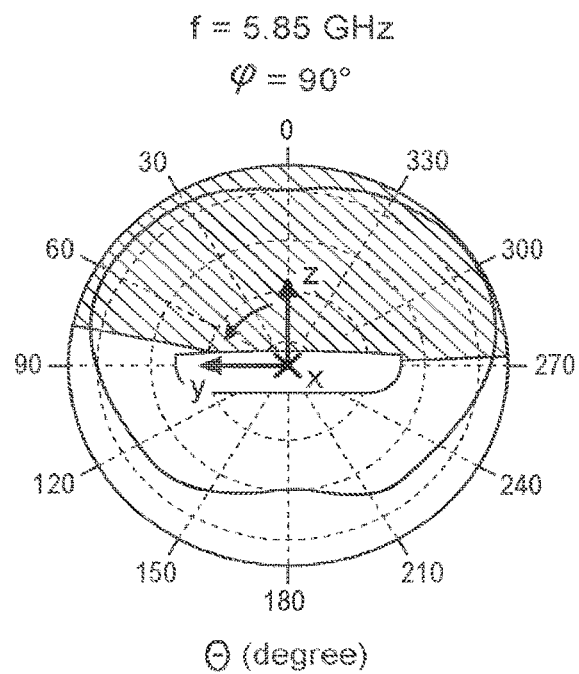
Figure 9F:
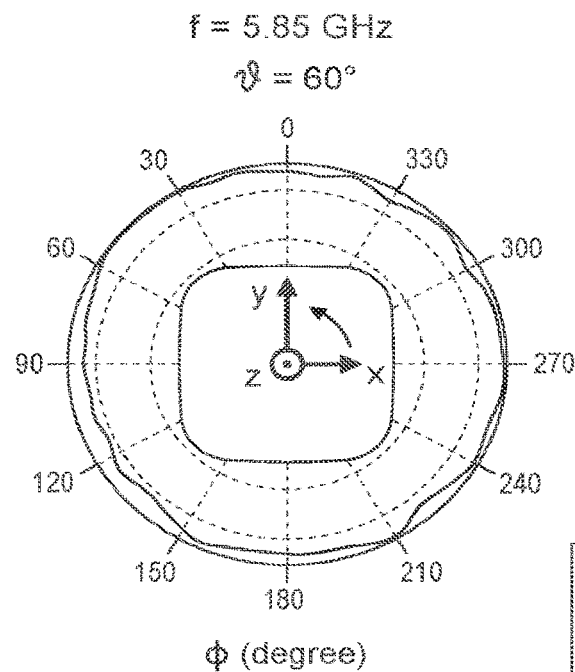

FIGS. 7a and 7b show a graph of the parasitic mutual coupling level measured between the dual band antennas A-D in said frequency ranges. The desired isolation value of above 20 dB is achieved for all antenna combinations.

FIGS. 8a-8f show the normalized radiation patterns for antennas A-D. It can be observed that the radiation patterns of the antennas substantially overlap for each measurement. Hence the radiation pattern can be qualified as quasi uniform, meaning that the antenna system according to the present invention provides uniform radio coverage without radiation nulls and/or blind spots for both the 2.4 and 5 GHz frequency band. This is supported by the results of the normalized aggregated radiation patterns for antennas A-D as shown in FIGS. 9a-9f.

FIGS. 10-15c are related to the second antennas E-H as shown in the previous figures. If a dotted line is indicated in the figure, the measured value should be below this threshold line. If an uninterrupted line is shown, the measured value should be above this threshold line.

Figure 10:
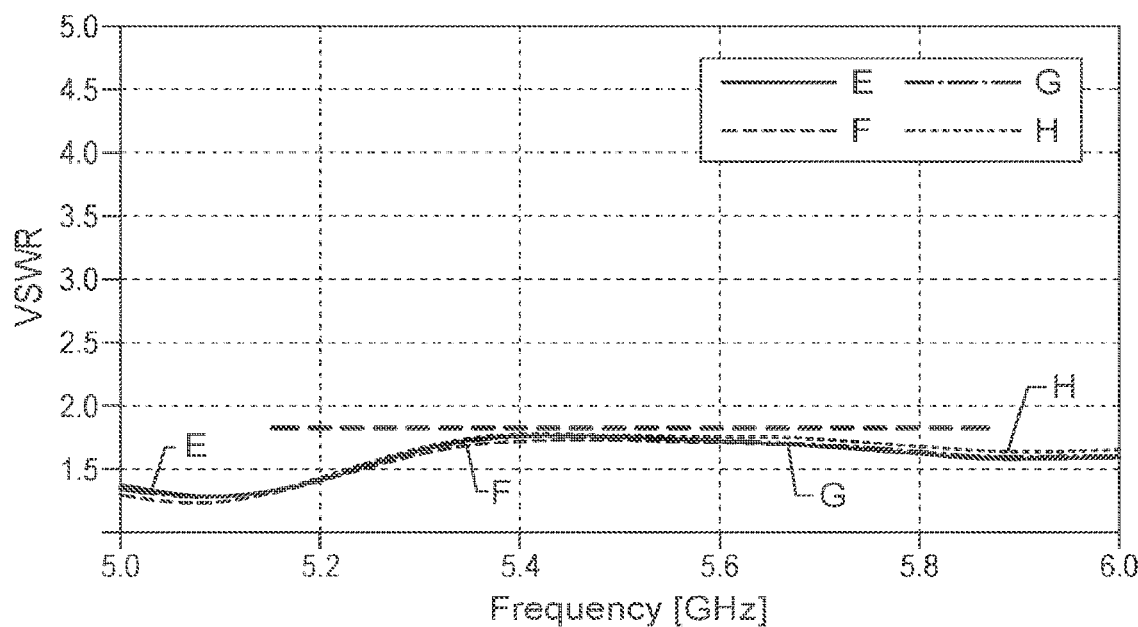

FIG. 10 shows a graph of the Voltage Standing Wave Ratio (VSWR) in relation to the frequency expressed in GHz. A performance requirement is that the VSWR is below 1.75:1. The measurements are done for four second antennas (E-H) used in an antenna system according to the present invention, which is shown in the previous figures. It can be seen that the results measured in the 5 GHz frequency band are below the requirement which is indicated with the dotted line.

Figure 11:
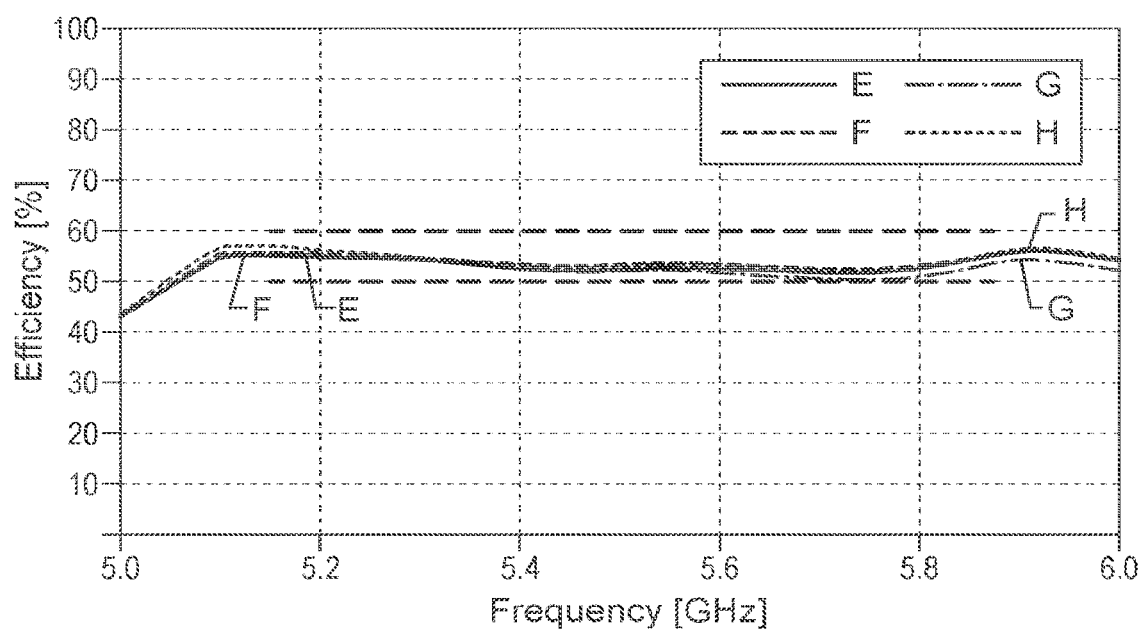

FIG. 11 shows a graph of the total efficiency (expressed in %) across the 5 GHz frequency band, which meets the requirements indicated within the uninterrupted lines for all antennas E-H.

Figure 12:
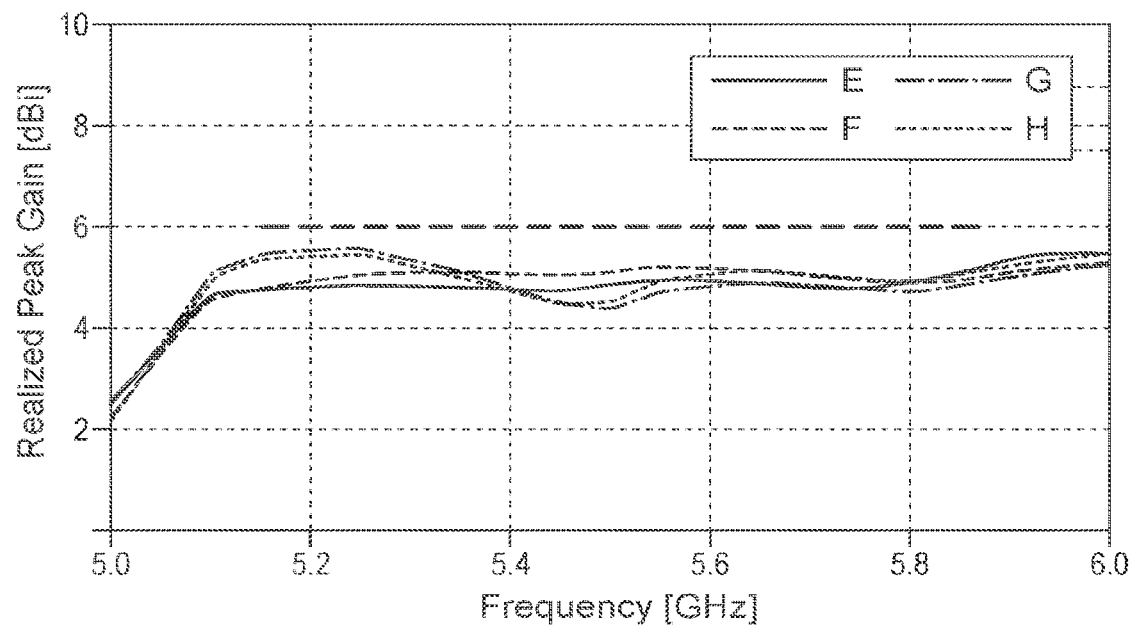

FIG. 12 shows a graph of the peak realized gain level (PRG) in the 5 GHZ frequency band. It can be seen that in this frequency band values below 5.6 dBi are measured. These values are below the maximal level of 6.0 dBi specified by Federal Communications Commission (FCC) regulation.

Figure 13:
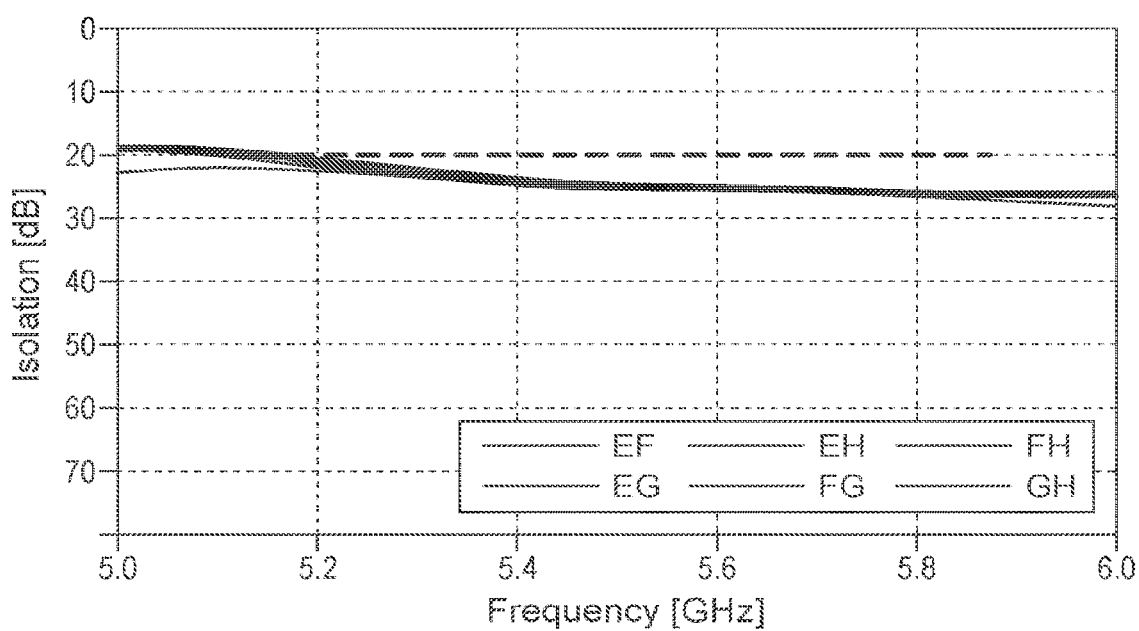

FIG. 13 shows the isolation between the single-band 5 GHz antennas in the second MIMO pair. A graph of the parasitic mutual coupling level measured between the single-band band antennas E-H is shown. The desired isolation value of above 20 dB is achieved for all the antenna combinations.

FIGS. 14a-14c show the normalized radiation patterns for antennas E-H. It can be observed that the radiation patterns of the antennas substantially overlap for each measurement. Hence the radiation pattern can be qualified as quasi uniform, meaning that the antenna system according to the present invention provides uniform radio coverage without radiation nulls and/or blind spots in the 5 GHZ frequency band. This is supported by the results of the normalized aggregated radiation patterns for antennas E-H as shown in FIGS. 15a-15c.

FIGS. 16-24 are related to the third antennas I-L as shown in the previous figures. If a dotted line is indicated in the figure, the measured value should be below this threshold line. If an uninterrupted line is shown, the measured value should be above this threshold line.

Figure 16:
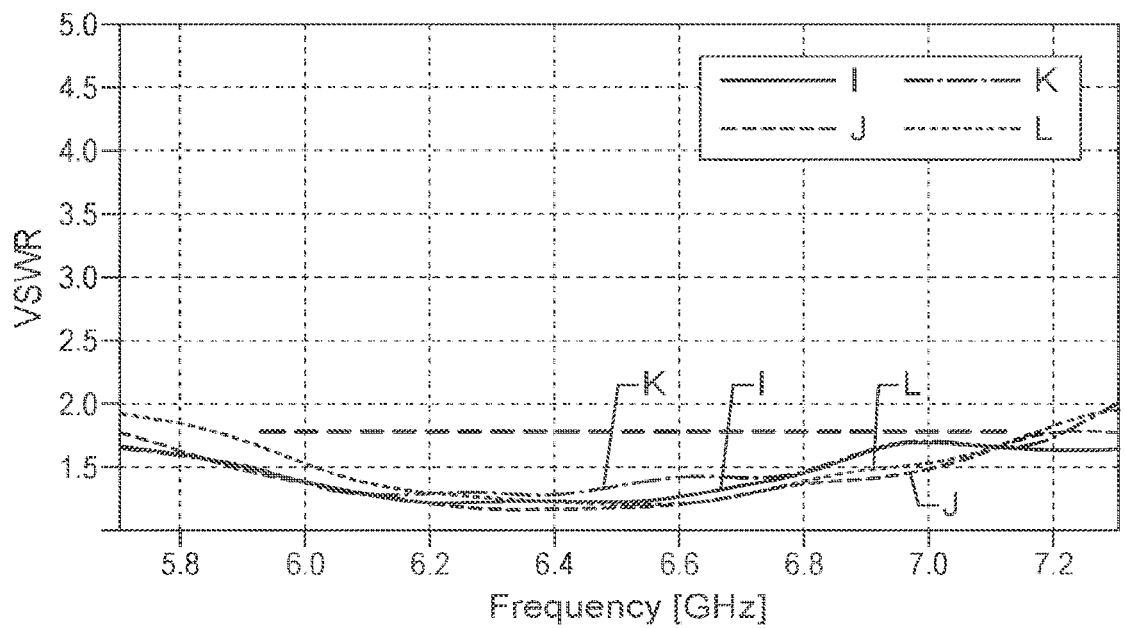

FIG. 16 shows a graph of the Voltage Standing Wave Ratio (VSWR) in relation to the frequency expressed in GHz. A performance requirement is that the VSWR is below 1.71:1. The measurements are done for four third antennas (I-L) used in an antenna system according to the present invention, which is shown in the previous figures. It can be seen that the results measured in the 6 GHz frequency band are below the requirement which is indicated with the dotted line.

Figure 17:
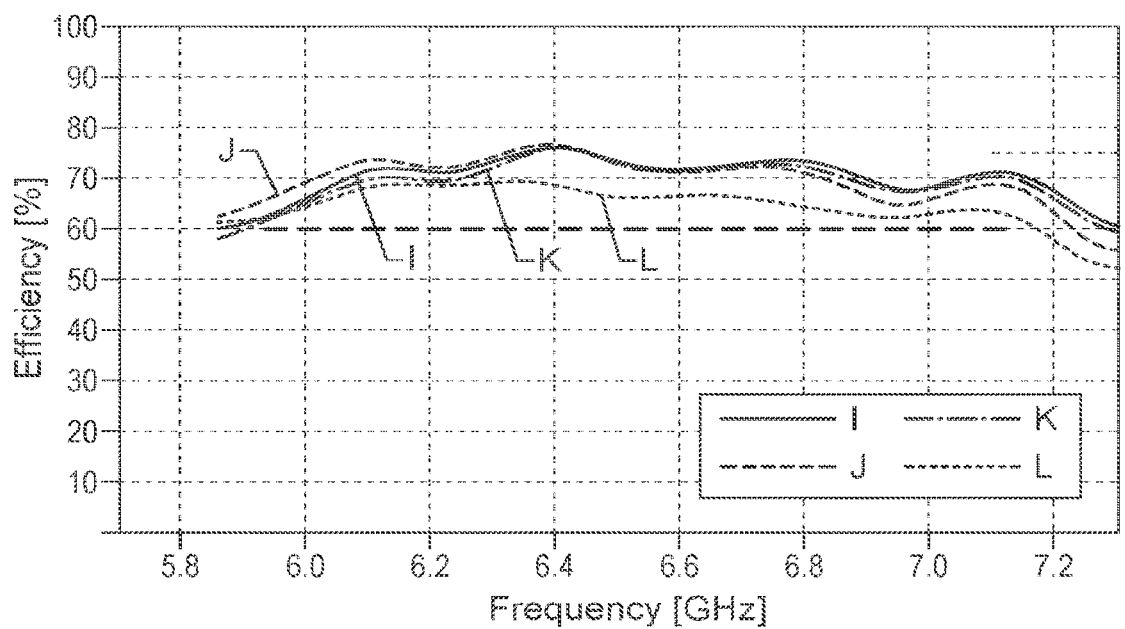

FIG. 17 shows a graph of the total efficiency (expressed in %) across the 6 GHZ frequency band, which meets the requirements indicated with the uninterrupted line for all antennas I-L.

Figure 18:
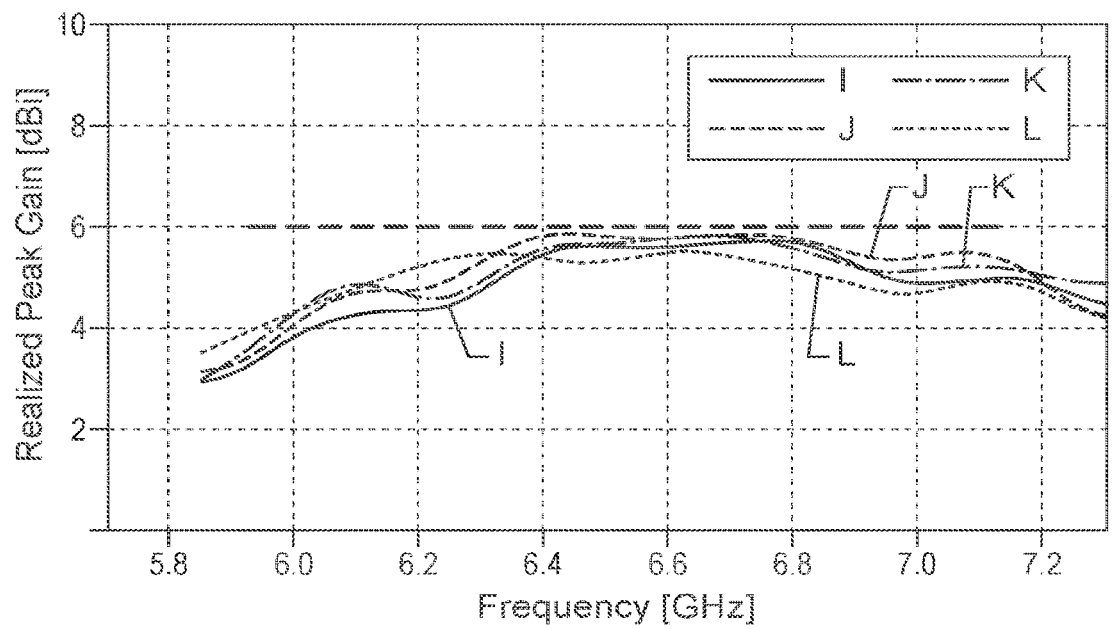

FIG. 18 shows a graph of the peak realized gain level (PRG) in the 6 GHZ frequency band. It can be seen that in this frequency band values below 5.8 dBi are measured. These values are below the maximal level of 6.0 dBi specified by Federal Communications Commission (FCC) regulation.

Figure 19:
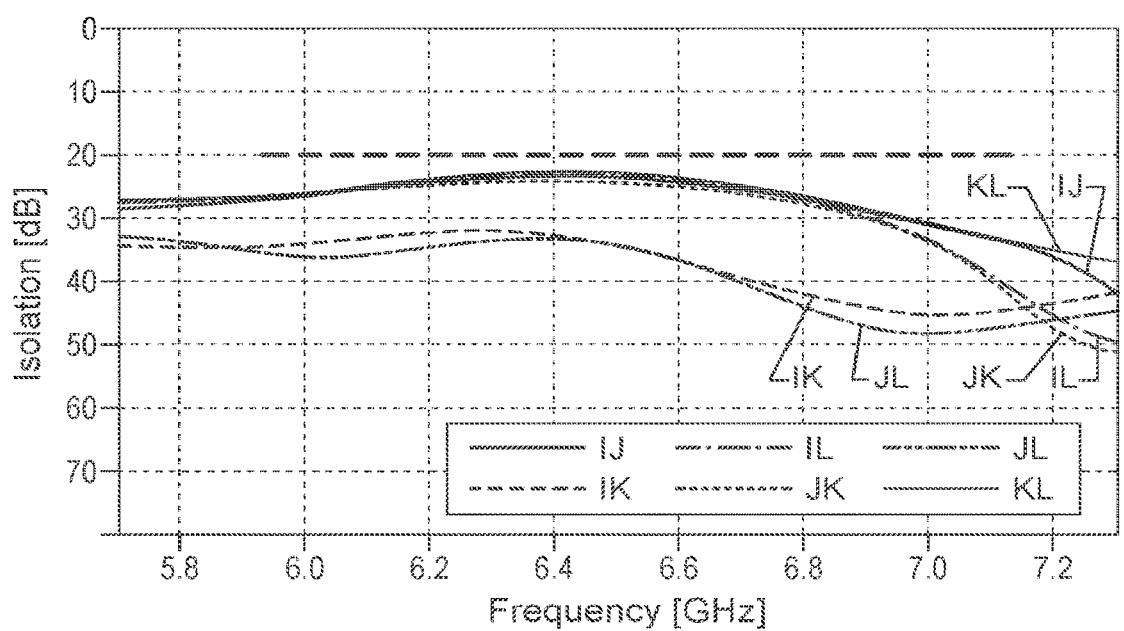

FIG. 19 shows the isolation between the single-band 6 GHz antennas in the third MIMO pair. A graph of the parasitic mutual coupling level measured between the third antennas I-L is shown. The desired isolation value of above 20 dB, in particular above 23.4 dB, is achieved for all the antenna combinations.

Figure 20A:
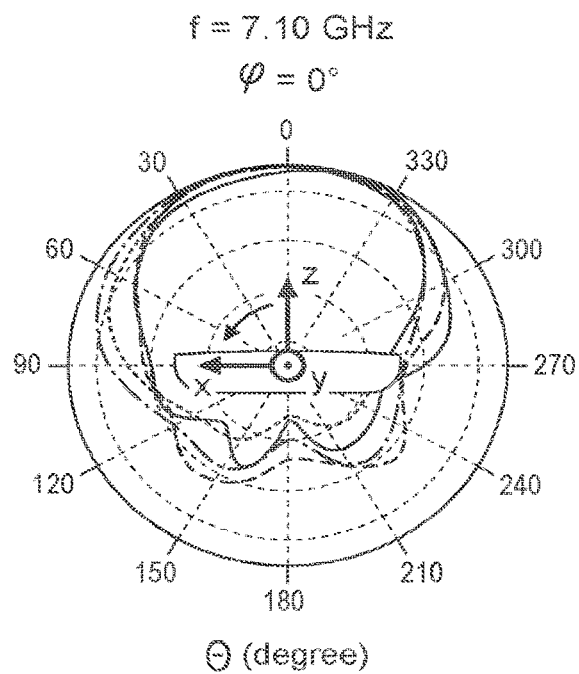
Figure 20B:
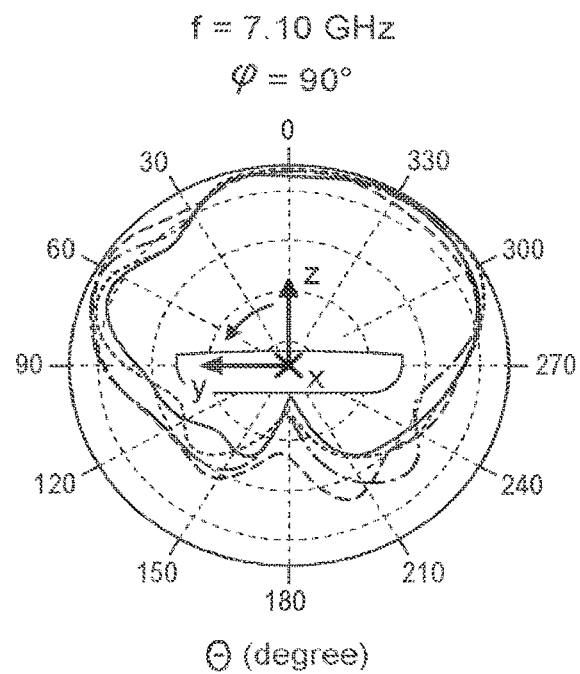
Figure 20C:
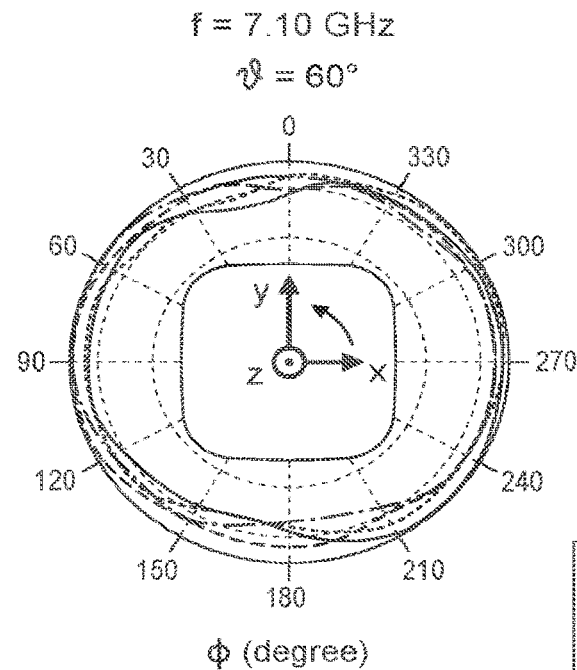

FIGS. 20a-20c show the normalized radiation patterns for antennas I-L. It can be observed that the radiation patterns of the antennas substantially overlap for each measurement. Hence the radiation pattern can be qualified as quasi uniform, meaning that the antenna system according to the present invention provides uniform radio coverage without radiation nulls and/or blind spots in the 6 GHZ frequency band. This is supported by the results of the normalized aggregated radiation patterns for antennas I-L as shown in FIGS. 21a-21c.

Figure 22:
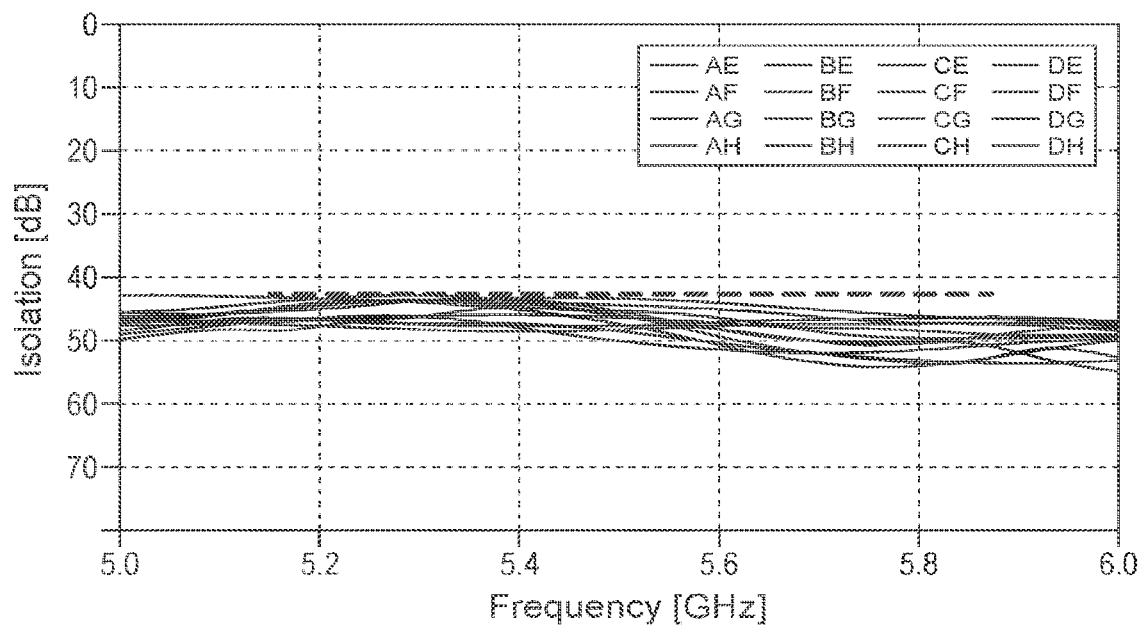

FIG. 22 shows the isolation between the first MIMO pair and the second MIMO pair. A graph of the parasitic mutual coupling level measured between the dual-band antennas A-D and the single-band antennas E-H is shown. The desired isolation value of above 43 dB is achieved for all the antenna combinations in the 5 GHz frequency band.

Figure 23:
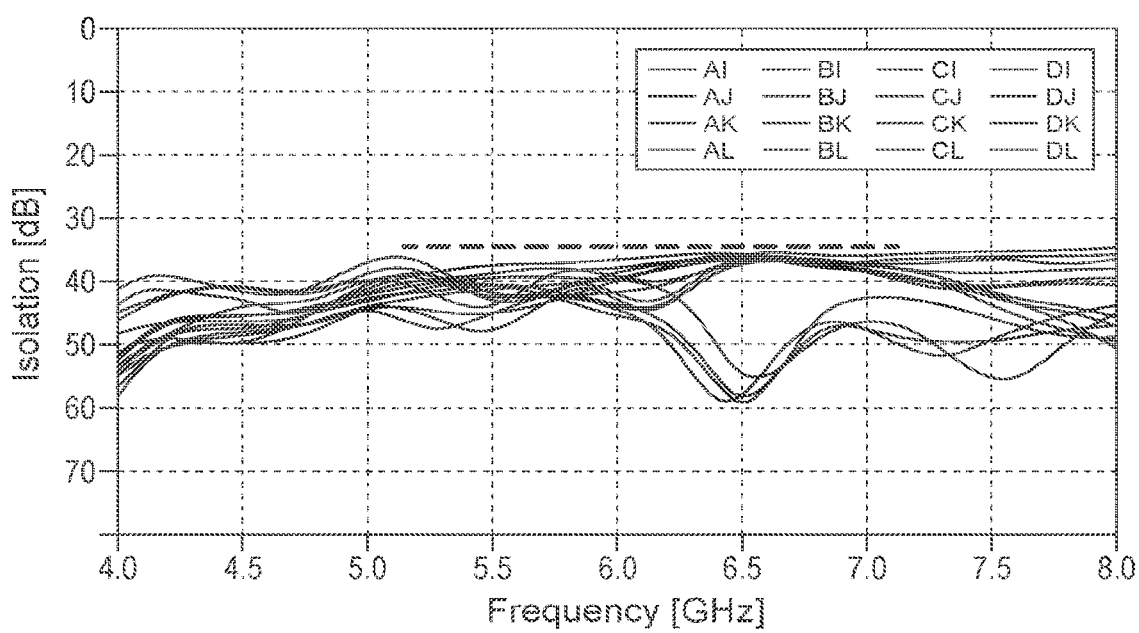

FIG. 23 shows the isolation between the first MIMO pair and the third MIMO pair. A graph of the parasitic mutual coupling level measured between the dual-band antennas A-D and the single-band antennas I-L is shown. The desired isolation value of above 34.9 dB is achieved for all the antenna combinations in the 5 GHZ and 6 GHz frequency bands.

Figure 24:
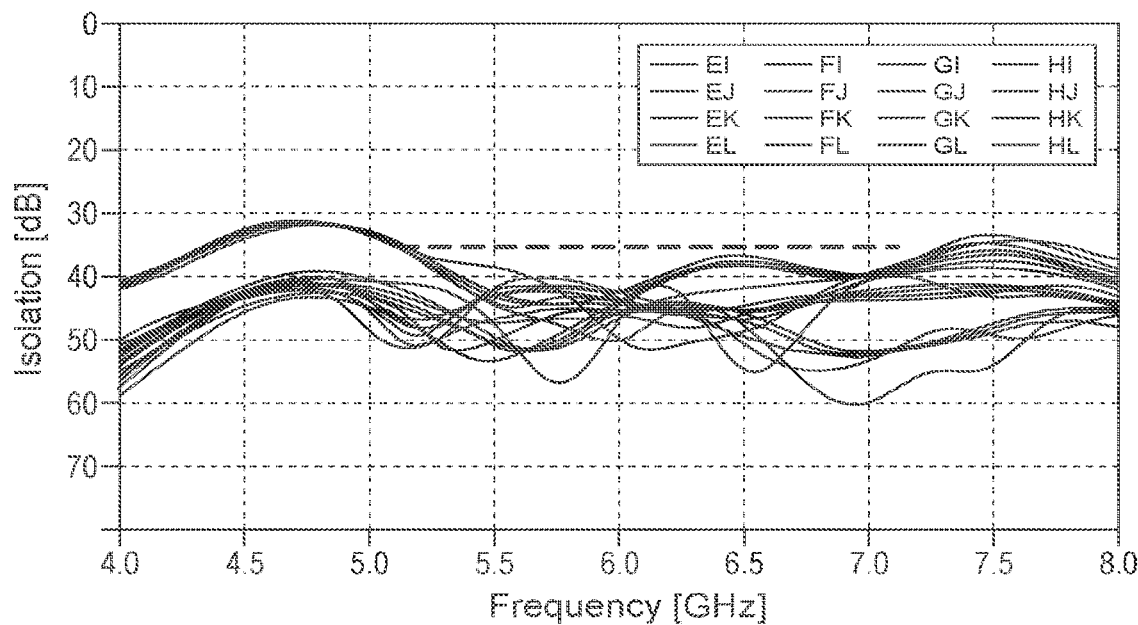

FIG. 24 shows the isolation between the second MIMO pair and the third MIMO pair. A graph of the parasitic mutual coupling level measured between the dual-band antennas E-H and the single-band antennas I-L is shown. The desired isolation value of above 35.1 dB is achieved for all the antenna combinations in the 5 GHz and 6 GHz frequency bands.

Figure 25:
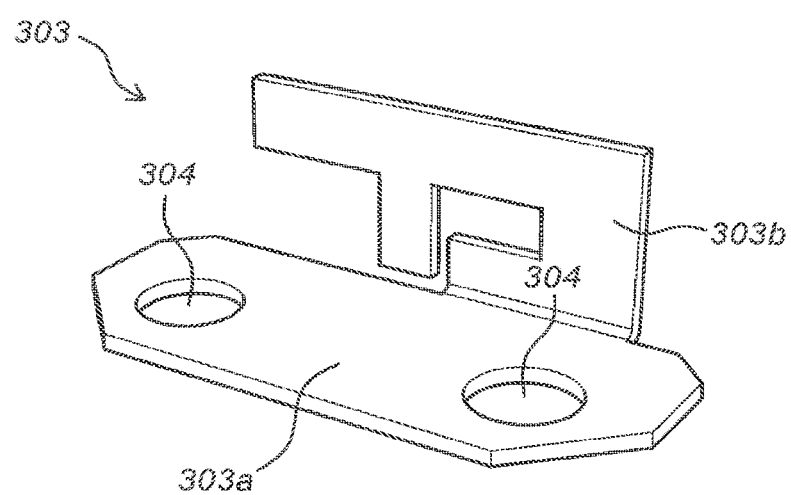

FIG. 25 shows a non-limiting example of a possible embodiment of a third antenna 303 according to the present invention. The third antenna 303 as shown is a metal-stamped antenna 303. The antenna 303 has a three-dimensional configuration and is configured to operate in the 6 GHz frequency band. The base part 303a of the antenna 303 is configured to be mounted onto, for example, a ground plane and the extended part 303b extends with respect to base part 303a in an upward direction. The base part 303a comprises two receiving spaces 304 for receiving at least part of a connection element. Both the base part 303a and the extended part 303b have a substantially flat configuration. The extended part 303b has a substantially horizontally oriented elongated upper part which is connected to the base part 303a via an L-shaped leg. The extended part 303b, and in particular the elongated upper part, further comprises a downward leg. The downward leg and the L-shaped leg are positioned at a distance from each other, in particular such that they enclose an open space.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application.

The ordinal numbers used in this document, like "first", and "second", are used only for identification purposes. Expressions like "horizontal", and "vertical", are relative expressions with respect to a plane defined by the ground plane. The verb "comprise" and conjugations thereof used in this patent publication are understood to mean not only "comprise", but are also understood to mean the phrases "contain", "substantially consist of", "formed by" and conjugations thereof.

It is imaginable that the MIMO antenna system according to the appended claims as filed is not configured to operate in the 2.4 GHZ, 5 GHZ, and 6 GHz frequency band, but is configured to operate in the frequency band of 24 GHZ-300 GHz, in particular 30 GHZ-100 GHz ("mmWave Communication"), and/or in the frequency band 100 GHz-10 THz ("Terahertz Communication"). This latter MIMO antenna systems are sometimes also referred to as Ultra-Massive MIMO (UM-MIMO) antenna systems, and fulfil the needs of applications and devices requiring high speed transmission. Technologies in this higher frequency bands (up to 10 THz) include, for example, ultra-fast short-range wireless communications, remote sensing, biological detection, basic material research, enhanced indoor wireless communications, vehicular communications, drone-to-drone communications, device-to-device (D2D) communications, and nano-communications. It is conceivable that the MIMO antenna system according to the invention is configured to operate both in the 2.4, 5, and 6 GHz frequency band, as well as in the one or more of the aforementioned frequency bands of 24 GHZ-300 GHZ, in particular 30 GHz-100 GHz, and/or 100 GHz-10 THz.

The invention claimed is:

1. A Multiple-Input, Multiple-Output ("MIMO") antenna system for IEEE 802.11 WiFi communications, comprising:
   a conductive ground plane,
   a first MIMO pair of mutually spaced first antennas, mounted onto and/or configured to co-act with a top surface of said conductive ground plane, and configured to operate in the 5 GHz frequency band and/or the 2.4 GHz frequency band,
   a second MIMO pair of mutually spaced second antennas mounted onto and/or configured to co-act with the top surface of said conductive ground plane, and configured to operate in the 5 GHz frequency band and/or the 2.4 GHz frequency band, and
   a third MIMO pair of mutually spaced third antennas mounted onto and/or configured to co-act with the top surface of said conductive ground plane, and configured to operate in the 6 GHz frequency band,
   wherein at least two first antennas are positioned in a direct line of sight with each other,
   wherein at least two second antennas are positioned in a direct line sight with each other,
   wherein at least two third antennas are positioned in a direct line of sight with each other, and
   wherein the third MIMO pair is located inside a surface area bounded by the first antennas of the first MIMO pair and the second MIMO pair is located inside a surface area bounded by the third antennas of the third MIMO pair.

2. The MIMO antenna system according to claim 1, wherein said first MIMO pair of first antennas of the first MIMO pair and at least a part of said third MIMO pair of third antennas are mutually integrated, wherein a plurality of first antennas is configured to operate in the 6 GHz frequency band and/or 5 GHz frequency band and/or the 2.4 GHz frequency band.

3. The MIMO antenna system according to claim 1, wherein said second MIMO pair of second antennas of the second MIMO pair and at least a part of said third MIMO pair of third antennas are mutually integrated, wherein a plurality of second antennas is configured to operate in the 6 GHz frequency band and/or 5 GHz frequency band and/or the 2.4 GHz frequency band.

4. The MIMO antenna system according to claim 1, wherein the antennas of at least two different MIMO pairs are polarized in different directions.

5. The MIMO antenna system according to claim 1, wherein the first antennas of the first MIMO pair are vertically polarized.

6. The MIMO antenna system according to claim 1, wherein the second antennas of the second MIMO pair are horizontally polarized.

7. The MIMO antenna system according to claim 1, wherein the third antennas of the third MIMO pair are vertically polarized.

8. The MIMO antenna system according to claim 1, wherein the first antennas of the first MIMO pair are configured to operate as dual-band antennas in both the 5 GHz frequency band and the 2.4 GHz frequency band.

9. The MIMO antenna system according to claim 1, wherein at least one of the antennas of the MIMO pairs is mounted on the conductive ground plane.

10. The MIMO antenna system according to claim 1, wherein the MIMO antenna system comprises a cover configured to at least partially cover the antennas of the MIMO antenna system, wherein at least one of the antennas of the MIMO system is affixed to the cover.

11. The MIMO antenna system according to claim 1, wherein the antennas of each MIMO pair mutually define a MIMO pair related polygonal shape, preferably a convex polygonal shape, more preferably a regular convex polygonal shape, most preferably an equilateral convex polygonal shape, including a square or diamond shape, and wherein the size and/or orientation of at least two MIMO pair related polygonal shapes mutually differ.

12. The MIMO antenna system according to claim 1, wherein the first antennas of the first MIMO pair are configured to operate both in the 5 GHz frequency band and the 2.4 GHz frequency band, and wherein the second antennas of the second MIMO pair are configured to operate solely in the 5 GHz frequency band.

13. The MIMO antenna system according to claim 1, wherein at least one of the third antennas of the third MIMO pair comprises a bottom section running parallel to the conductive ground plane, and at least one top section, connected to said bottom section, and oriented perpendicularly with respect to said conductive ground plane, wherein the top section comprises an elongated strip, positioned at a distance from the conductive ground plane, and extending parallel to said conductive ground plane, and wherein the top section comprises a cross-strip connected to a center portion of the elongated strip, wherein said cross-strip is orientated towards the bottom section of said third antenna, and wherein said cross-strip is positioned at a distance from the bottom section.

14. A wireless device, including a wireless access points (AP), a router, a gateway, and/or a bridge, comprising at least one MIMO antenna system according to claim 1.

15. A wireless communication system, comprising a plurality of MIMO antennas systems according to claim 1.

* * * * *